(12) United States Patent
Lee et al.

(10) Patent No.: US 11,675,112 B2
(45) Date of Patent: Jun. 13, 2023

(54) SENSING MODULE AND ELECTRONIC DEVICE INCLUDING THE SAME

(71) Applicant: Samsung Electronics Co., Ltd., Suwon-si (KR)

(72) Inventors: Kyunghwan Lee, Seoul (KR); Daekwan Kim, Suwon-si (KR); Yohwan Noh, Jeongeup-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 228 days.

(21) Appl. No.: 16/806,011

(22) Filed: Mar. 2, 2020

(65) Prior Publication Data

US 2021/0049340 A1 Feb. 18, 2021

(30) Foreign Application Priority Data

Aug. 12, 2019 (KR) .......................... 10-2019-0098401

(51) Int. Cl.
| | |
|---|---|
| *G02B 3/00* | (2006.01) |
| *G06V 40/13* | (2022.01) |
| *G06V 10/10* | (2022.01) |
| *G06V 40/12* | (2022.01) |

(52) U.S. Cl.
CPC .......... *G02B 3/0062* (2013.01); *G06V 10/17* (2022.01); *G06V 40/1318* (2022.01); *G06V 40/1324* (2022.01); *G06V 40/1341* (2022.01)

(58) Field of Classification Search
None
See application file for complete search history.

(56) References Cited

U.S. PATENT DOCUMENTS

| | | | |
|---|---|---|---|
| 6,259,108 B1 | 7/2001 | Antonelli et al. | |
| 9,083,873 B1* | 7/2015 | Lewkow | ................. G02B 7/08 |
| 9,477,871 B2 | 10/2016 | Wu | |
| 9,864,893 B2 | 1/2018 | Kim et al. | |
| 10,665,631 B1* | 5/2020 | Cai | ................. H01L 27/14678 |
| 2003/0063783 A1 | 4/2003 | Higuchi | |
| 2007/0038118 A1* | 2/2007 | DePue | ................. A61B 5/489 |
| | | | 600/476 |

(Continued)

FOREIGN PATENT DOCUMENTS

| | | |
|---|---|---|
| JP | 2002-527832 A | 8/2002 |
| JP | 2005-319294 A | 11/2005 |

(Continued)

*Primary Examiner* — Benjamin X Casarez

(74) *Attorney, Agent, or Firm* — Harness, Dickey & Pierce, P.L.C.

(57) ABSTRACT

An electronic device includes a substrate, a plurality of light sources, the plurality of light sources configured to emit an optical signal to an object through the substrate, at least one sensor underneath the substrate, the at least one sensor configured to detect biometric information associated with the object by receiving a reflected light signal, the reflected light signal corresponding to the optical signal reflected off the object and transferred through the substrate, and a multi-lens array including at least one support layer, a plurality of first lenses, and a plurality of second lenses, the at least one support layer in an upper portion of the at least one sensor, the plurality of first lenses on an upper surface of the at least one support layer, and the plurality of second lenses on a lower surface of the at least one support layer.

19 Claims, 19 Drawing Sheets

(56) References Cited

U.S. PATENT DOCUMENTS

| | | | |
|---|---|---|---|
| 2008/0316323 A1* | 12/2008 | Morita | H04N 5/2628 |
| | | | 348/222.1 |
| 2014/0376097 A1* | 12/2014 | Yamashita | G02B 3/0031 |
| | | | 359/619 |
| 2015/0116527 A1* | 4/2015 | Rossi | H04N 5/3415 |
| | | | 348/218.1 |
| 2016/0188950 A1 | 6/2016 | Liu et al. | |
| 2016/0252734 A1* | 9/2016 | Rossi | H01L 27/14625 |
| | | | 348/340 |
| 2017/0261650 A1 | 9/2017 | Powell | |
| 2019/0012512 A1 | 1/2019 | He et al. | |
| 2019/0373147 A1* | 12/2019 | Yamamoto | H04N 5/2254 |
| 2020/0184185 A1* | 6/2020 | Mackey | G06K 9/00046 |
| 2020/0327296 A1* | 10/2020 | Wu | H01L 27/1462 |
| 2021/0011578 A1* | 1/2021 | Zhang | G06F 3/0421 |
| 2021/0165234 A1* | 6/2021 | Tillkorn | G02B 3/0075 |
| 2021/0271848 A1* | 9/2021 | Okubo | G06V 40/1318 |
| 2021/0286963 A1* | 9/2021 | Gao | G06K 9/0004 |

FOREIGN PATENT DOCUMENTS

| | | |
|---|---|---|
| KR | 10-1376227 B1 | 3/2014 |
| KR | 10-2018-0001904 A | 1/2018 |
| KR | 10-2018-0085227 A | 7/2018 |
| KR | 10-2019-0023937 A | 3/2019 |

\* cited by examiner

SENSING MODULE AND ELECTRONIC DEVICE INCLUDING THE SAME

CROSS-REFERENCE TO RELATED APPLICATION(S)

This U.S. non-provisional application claims the benefit of priority to Korean Patent Application No. 10-2019-0098401, filed on Aug. 12, 2019 in the Korean Intellectual Property Office, the disclosure of which is incorporated herein by reference in its entirety.

BACKGROUND

Various example embodiments of the inventive concepts relate to sensing modules, electronic devices including the same, methods of operating the sensing module, and/or non-transitory computer readable media for operating the sensing module.

Recently, electronic devices provide various functions for sensing biometric information. As an example of a method of sensing biometric information, an optical sensing method is used. An optical sensing method is used to obtain biometric information by sensing light reflected from a part of a user's body, using a sensing module provided in an electronic device. To improve sensing accuracy in the optical sensing method, it may be desired and/or necessary to increase the number of lenses included in a sensing module. However, when the lenses included in a sensing module are arranged in a stack structure, a height of a sensing module (e.g., the thickness of the sensing module) may increase, such that it may be difficult to reduce a size of an electronic device (e.g., the thickness of the electronic device). Therefore, a sensing area of the sensing module may decrease, or in other words a smaller sensing module with a smaller number of lenses may need to be used to maintain the desired thickness of the electronic device.

SUMMARY

Various example embodiments of the inventive concepts provide a sensing module which may have a reduced height, a reduced thickness, and/or an increased sensing area, an electronic device including the same, a non-transitory computer readable medium and/or methods for operating the sensing module.

According to at least one example embodiment of the present inventive concepts, an electronic device includes a substrate, a display panel including a plurality of light sources, the plurality of light sources configured to emit an optical signal to an object through the substrate, at least one sensor underneath the substrate, the at least one sensor including processing circuitry configured to detect biometric information associated with the object by receiving a reflected light signal, the reflected light signal corresponding to the optical signal reflected off the object and transferred through the substrate, and a multi-lens array including at least one support layer, a plurality of first lenses, and a plurality of second lenses, the at least one support layer in an upper portion of the at least one sensor, the plurality of first lenses on an upper surface of the at least one support layer, and the plurality of second lenses on a lower surface of the at least one support layer.

According to at least one example embodiment of the present inventive concepts, an electronic device includes a display panel in an upper portion of a substrate and including a plurality of light sources configured to emit an optical signal to an object, at least one optical sensor on the substrate and configured to sense reflected light corresponding to the optical signal, the reflected light reflected from the object and passing through a detection area defined in the display panel, a lens support layer in an upper portion of the at least one optical sensor, a plurality of lenses on at least one of an upper surface and a lower surface of the lens support layer in a direction parallel to the upper surface of the substrate, and a position control layer in the upper portion of the substrate and including processing circuitry, the position control layer configured to control a position of the at least one optical sensor and a position of at least one lens of the plurality of lenses.

According to at least one example embodiment of the present inventive concepts, a sensing module includes at least one sensor in an upper portion of a substrate, the at least one sensor including processing circuitry, the processing circuitry configured to receive light reflected from an object adjacent to a sensing area, and obtain biometric information of the object, a multi-lens array including a plurality of lenses and a support layer, the plurality of lenses in an upper portion of the at least one sensor in a direction parallel to an upper surface of the substrate, and the support layer configured to support the plurality of lenses, and a position control layer in the upper portion of the substrate, the position control layer including position processing circuitry configured to control a position of the at least one sensor and a position of at least one lens of the plurality of lenses based on position information of the object in relation to the sensing area.

BRIEF DESCRIPTION OF DRAWINGS

The above and other aspects, features, and advantages of various example embodiments of the present inventive concepts will be more clearly understood from the following detailed description, taken in conjunction with the accompanying drawings, in which.

DETAILED DESCRIPTION

Hereinafter, example embodiments of the present inventive concepts will be described as follows with reference to the accompanying drawings.

Figure 1:
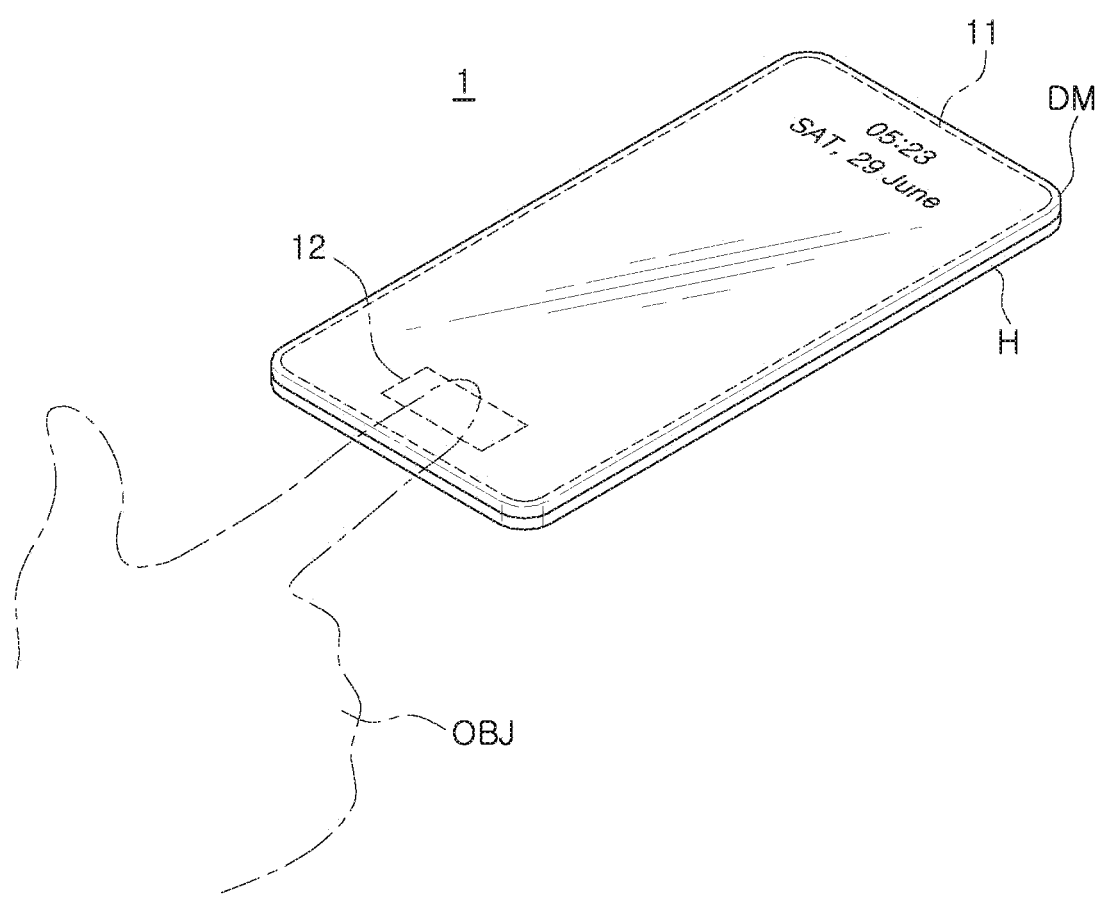
FIG. 1 is a perspective diagram illustrating an exterior of an electronic device including a sensing module according to at least one example embodiment of the present inventive concepts.
Figure 2:
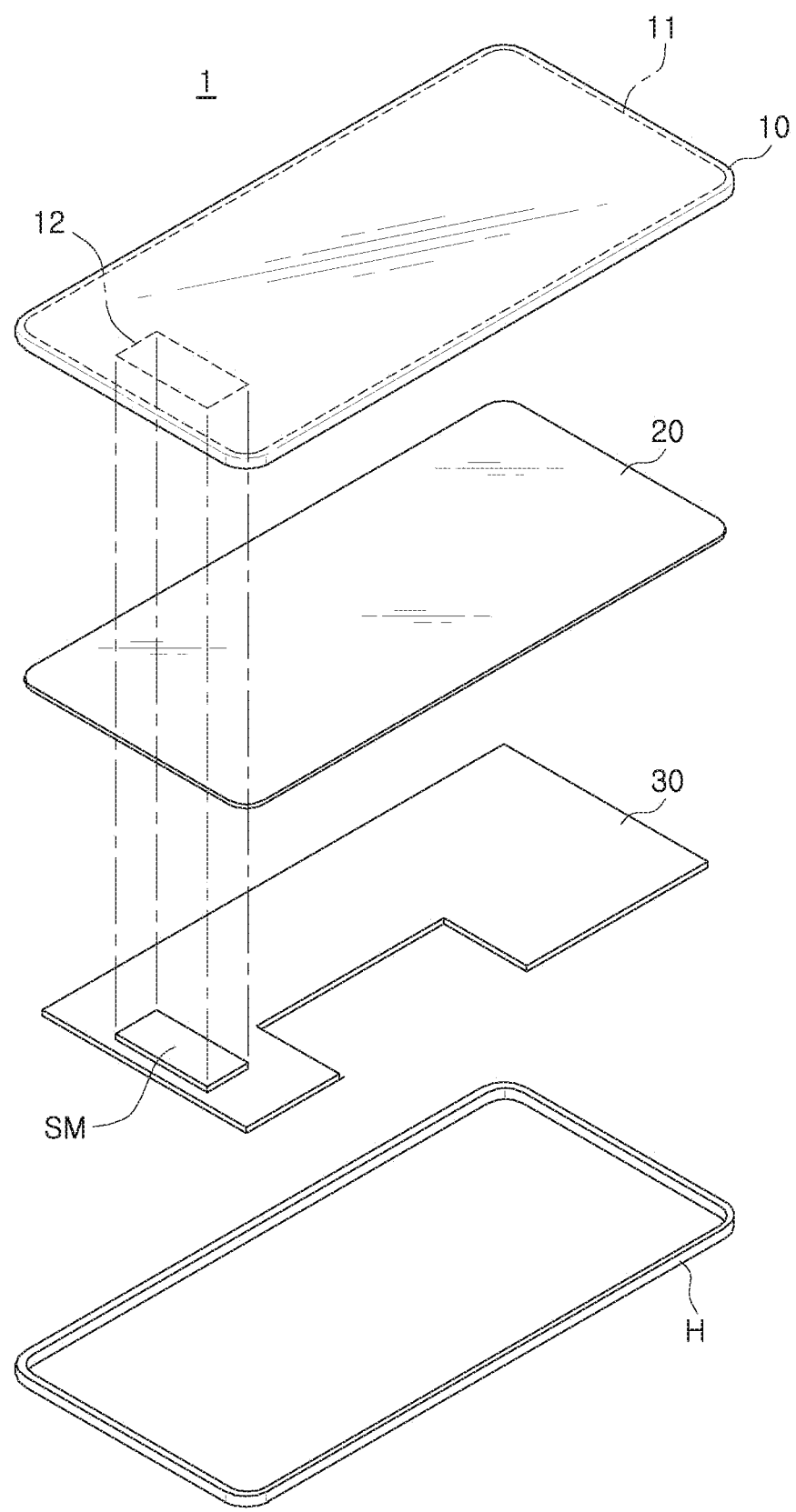
FIG. 2 is an exploded perspective diagram illustrating an electronic device including a sensing module according to at least one example embodiment of the present inventive concepts.

FIG. 1 is a perspective diagram illustrating an exterior of an electronic device including a sensing module according to at least one example embodiment. FIG. 2 is an exploded perspective diagram illustrating an electronic device including a sensing module according to at least one example embodiment.

Referring to FIGS. 1 and 2, an electronic device 1 may include a display module DM and/or a housing H enclosing a rear surface and a side surface and forming an exterior of the electronic device 1, however the example embodiments are not limited thereto.

The display module DM may include a substrate 10, a display panel 20, etc., but is not limited thereto.

The substrate 10 may provide a light emitting surface of the electronic device 1, may be disposed in (e.g., included in, located in, arranged in, etc.) an upper portion of the display panel 20, and/or may protect the display panel 20, etc. The substrate 10 may include a glass substrate, a sapphire substrate, a plastic substrate, and the like. The substrate 10 may have a multilayer structure or a single layer structure. For example, the substrate 10 may have a stack structure of a plurality of plastic substrates coupled to each other, for example with an adhesive or the like, or may have a stack structure of a glass substrate and a plastic substrate coupled to each other with an adhesive, etc.

The display panel 20 may include a plurality of pixels having light sources. The light source may output an optical signal under control of a display driver IC (DDI). The display panel 20 may display a variety of images by emitting an optical signal output from the light sources of the pixels through the substrate 10.

A first region 11 for outputting images and a second region 12 for obtaining biometric information of a user may be defined in (and/or virtually defined in) the substrate 10. For example, the first region 11 may be an entire region or a partial region (and/or may correspond to an entire region or a partial region) of the substrate 10, and the second region 12 may be a sensing area, partially or fully overlapping the first region 11.

When the first region 11 is activated, different images may be displayed and/or disposed on the first region 11 in different operating modes using the optical signal output from the light sources. For example, the electronic device 1 may display an image and/or images showing a current time, or the like, on the first region 11 in a standby mode in which only partial elements (e.g., pixels) of the electronic device 1 are activated, etc. In an activation mode in which all of the elements (e.g., pixels) of the electronic device 1 are activated, the electronic device 1 may display various types of images corresponding to a user input, and/or instructions from an operating system, software applications, etc., of the electronic device 1, on the first region 11.

When the second region 12 is activated, the electronic device 1 may obtain biometric information by sensing light reflected from a part of a user's body OBJ adjacent to the second region 12. For example, the electronic device 1 may obtain fingerprint information of a user by sensing light reflected from the valleys and ridges (e.g., a fingerprint) of a user's finger adjacent to (e.g., placed on) the second region 12. To this end, the electronic device 1 may include at least one sensing module SM disposed in a lower portion of the display panel 20 to obtain, receive, and/or detect the biometric information and/or fingerprint information of the user and transmit the obtained biometric information and/or the obtained fingerprint information of the user to processing circuitry (not shown) of the electronic device 1, but the example embodiments are not limited thereto.

The sensing module SM may be disposed on a second substrate 30, for example, the sensing module SM may be disposed in a space on the second substrate 30 including a space in which circuit components are disposed and/or a battery is accommodated, but the example embodiments are not limited thereto. Also, the sensing module SM may be configured to overlap the second region 12 in a direction perpendicular to the substrate 10, or in other words, the sensing module SM may be placed in a location on the substrate 10 below the second region 12.

The sensing module SM may receive an optical signal and may generate an electrical signal corresponding to the received optical signal. The optical signal received by the sensing module SM may include light reflected from the part of a user's body OBJ adjacent to the second region 12, from light originally generated (and/or emitted) by the light source of the one or more pixels. The reflected light may be received by the sensing module SM incident through the display panel 20. An electrical signal generated by the sensing module SM may be varied depending on (and/or based on) a wavelength and/or amplitude of the received reflected light.

The sensing module SM in the example embodiment may include a plurality of lenses disposed in parallel to an upper portion of the sensor such that a thickness of the electronic device 1 may be reduced, and a size of a sensing area may be expanded.

The housing H may be coupled to the substrate 10 and may define an internal space of the electronic device 1. The display panel 20, the substrate 30, and others, may be accommodated in an internal space of the electronic device 1 by the housing H.

The housing H may include a material having relatively high stiffness sufficient to provide structure and/or protection to the components of the electronic device 1, such as plastic, metal, glass, and the like, or combinations thereof. The housing H may protect the elements accommodated in the internal space of the electronic device 1 from external impacts, such as drops, and/or from external substances, such as water, dust, dirt, etc.

Figure 3:
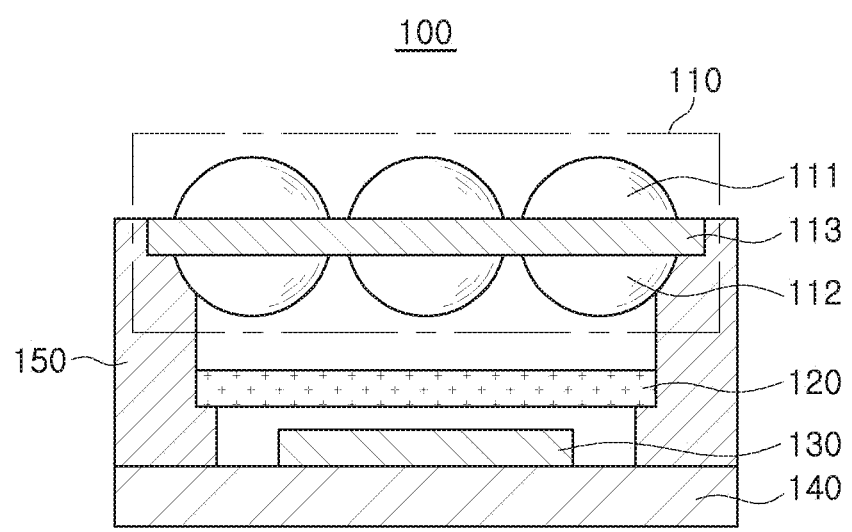
FIG. 3 is a cross-sectional diagram illustrating a sensing module according to at least one example embodiment of the present inventive concepts.

FIG. 3 is a cross-sectional diagram illustrating a sensing module according to at least one example embodiment.

Referring to FIG. 3, a sensing module 100 may include a multi-lens array 110, an optical filter 120, a sensor 130, a substrate 140, and/or a holder 150, but is not limited thereto. For example, the sensing module 100 may further include processing circuitry (not shown) for detecting, receiving, recognizing, obtaining and/or analyzing biometric information received by the sensor 130, etc., but the example embodiments are not limited thereto. The processing circuitry is further discussed in connection with FIG. 11 below.

The sensor 130 may include a plurality of optical sensing devices which may receive an optical signal (such as reflected light, etc.) incident to an internal space of the sensing module 100. The sensor 130 may be disposed on the substrate 140 including circuit components, and may include a charge coupled device image sensor (CCD), a CMOS image sensor, and the like. According to some example embodiments, the sensor 130 may include processing circuitry to detecting, receiving, recognizing, obtaining and/or analyzing biometric information received by the sensor 130, but the example embodiments are not limited thereto. The optical filter 120 may include a color filter, a monochrome filter, and others. The holder 150 may be disposed on the substrate 140 and may support the multi-lens array 110 and/or the optical filter 120, etc.

The multi-lens array 110 may include a plurality of lenses, such as lenses 111 and 112, etc., and a support layer 113 supporting the plurality of lenses 111 and 112. The plurality of lenses 111 and 112 may include a plurality of first lenses 111 (e.g., a first layer of lenses) disposed in parallel to an upper surface of the support layer 113, and a plurality of second lenses 112 (e.g., a second layer of lenses) disposed in parallel to a lower surface of the support layer 113. However, the example embodiments are not limited thereto and there may be a greater or lesser number of layers of lenses. In at least one example embodiment, a distance from a lower surface of a display panel to an uppermost portion of the plurality of first lenses 111 may be approximately 45%, or greater, of a distance from a lower surface of the display panel to a lower surface of the substrate 140, however the example embodiments are not limited thereto.

FIG. 3 illustrates an example in which the multi-lens array 110 includes three first lenses 111 and three second lenses 112, but the example embodiments are not limited thereto. For example, the multi-lens array 110 may include five first lenses 111 and five second lenses 112, etc. As the number of the plurality of lenses 111 and 112 included in the multi-lens array 110 increases, a size and resolution of a sensing area of the sensing module 100 may increase. Additionally, in some example embodiments, the number of layers of lenses may be greater or less than the two layers (e.g., lenses 111 and 112) of lenses shown in FIG. 3.

The plurality of lenses 111 and 112 may include lenses having various fields of view and/or refractive indices. For example, the fields of view of the plurality of lenses 111 and 112 may be the same, and the refractive indices of the plurality of lenses 111 and 112 may be the same. As another example, the fields of view and refractive indices of the first lenses 111 may be greater than the fields of view and refractive indices of the second lenses 112, respectively, or as another example, the fields of view of the plurality of lenses 111 and 112 may be different from one another, and the refractive indices of the plurality of lenses 111 and 112 may be different from one another.

As the plurality of lenses 111 and 112 are included in the multi-lens array 110, overall fields of view may be greater than the field of view of the individual plurality of lenses 111 and 112. In at least one example embodiment, an overall field of view of the multi-lens array 110 may be approximately 70 degrees or higher, but the example embodiments are not limited thereto.

Figure 4A:
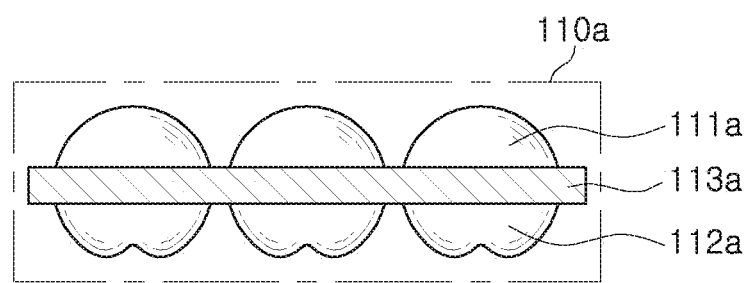
FIGS. 4A to 5B are diagrams illustrating a structure of a multi-lens array of a sensing module according to at least one example embodiment of the present inventive concepts.
Figure 4B:
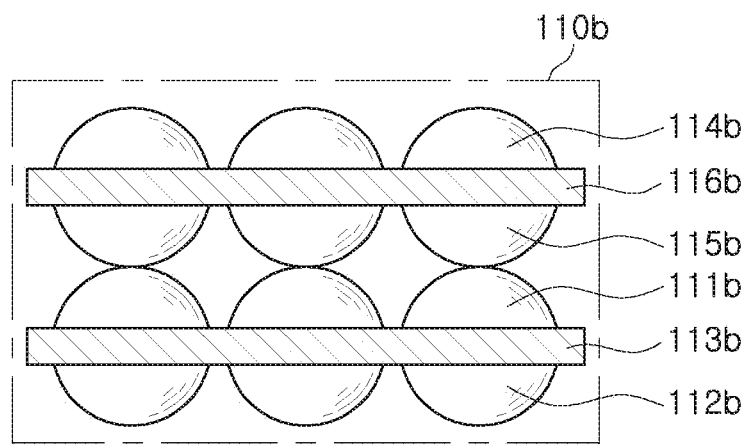

The plurality of lenses 111 and 112 may include one or more lenses having various shapes. For example, the plurality of lenses 111 and 112 may have the same shape, or alternatively, as illustrated in FIG. 4A, each of the first lenses 111 may have a semicircular shape, and each of the second lenses 112 may have a semicircular shape having a single concave groove, but the example embodiments are not limited thereto, and for example, one or more of the individual lenses of plurality of lenses 111 and 112 may have different shapes from other lenses in the same layer of lenses as well. In at least one example embodiment, the multi-lens array 110 may have a structure in which the first lenses 111 and the second lenses 112 are stacked in two stages. For example, as illustrated in FIG. 4B, a multi-lens array 110$b$ may include first lenses 111$b$ (e.g., a first layer of lenses) and second lenses 112$b$ (e.g., a second layer of lenses) disposed in an upper portion and a lower portion of a first support layer 113$b$, respectively, and first lenses 114$b$ (e.g., a third layer of lenses) and second lenses 116$b$ (e.g., a fourth layer of lenses) disposed in an upper portion and a lower portion of a second support layer 116$b$, respectively, however the example embodiments are not limited thereto and there may be a greater number of support layers and/or layers of lenses.

Figure 5A:
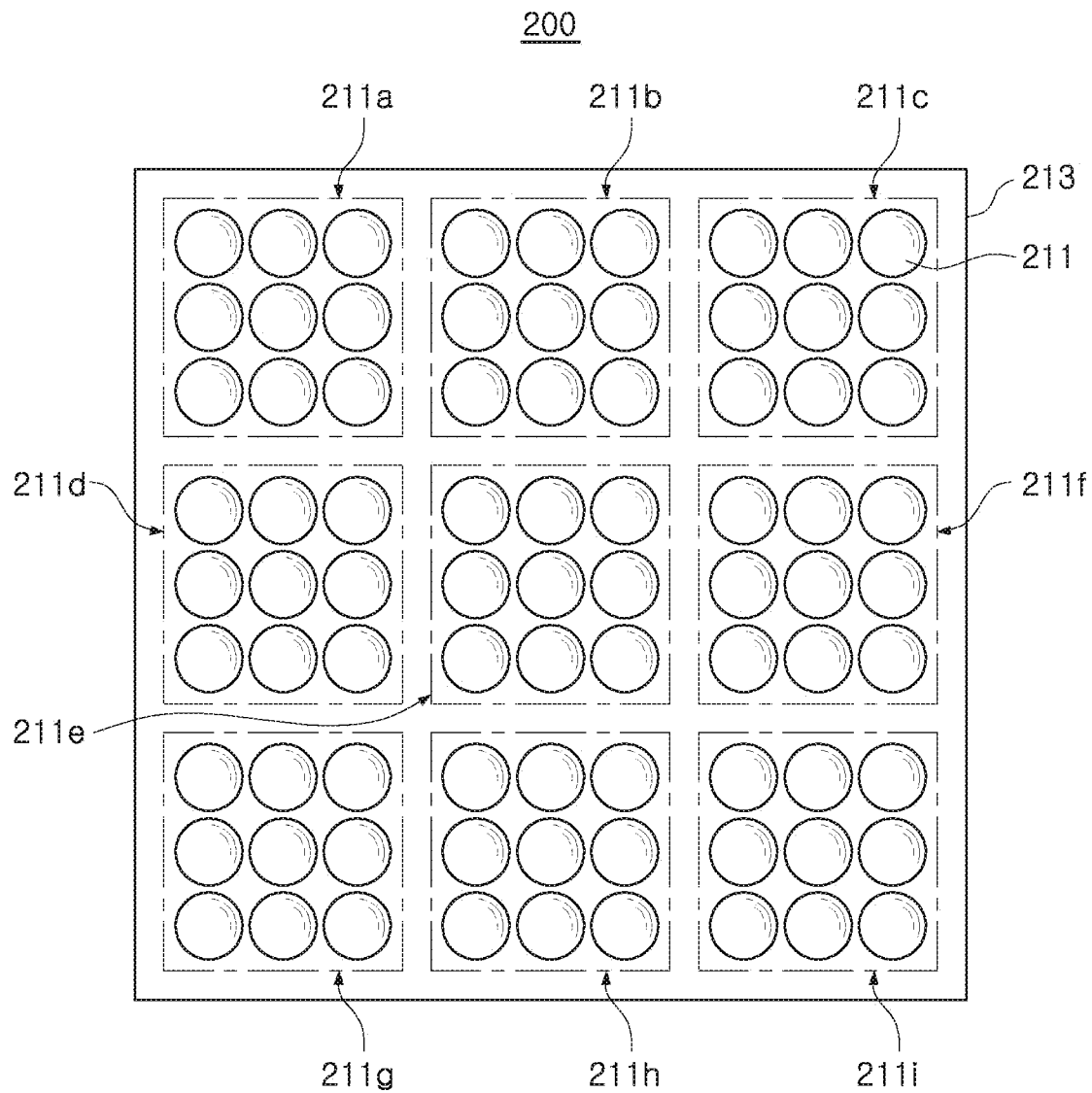
Figure 5B:
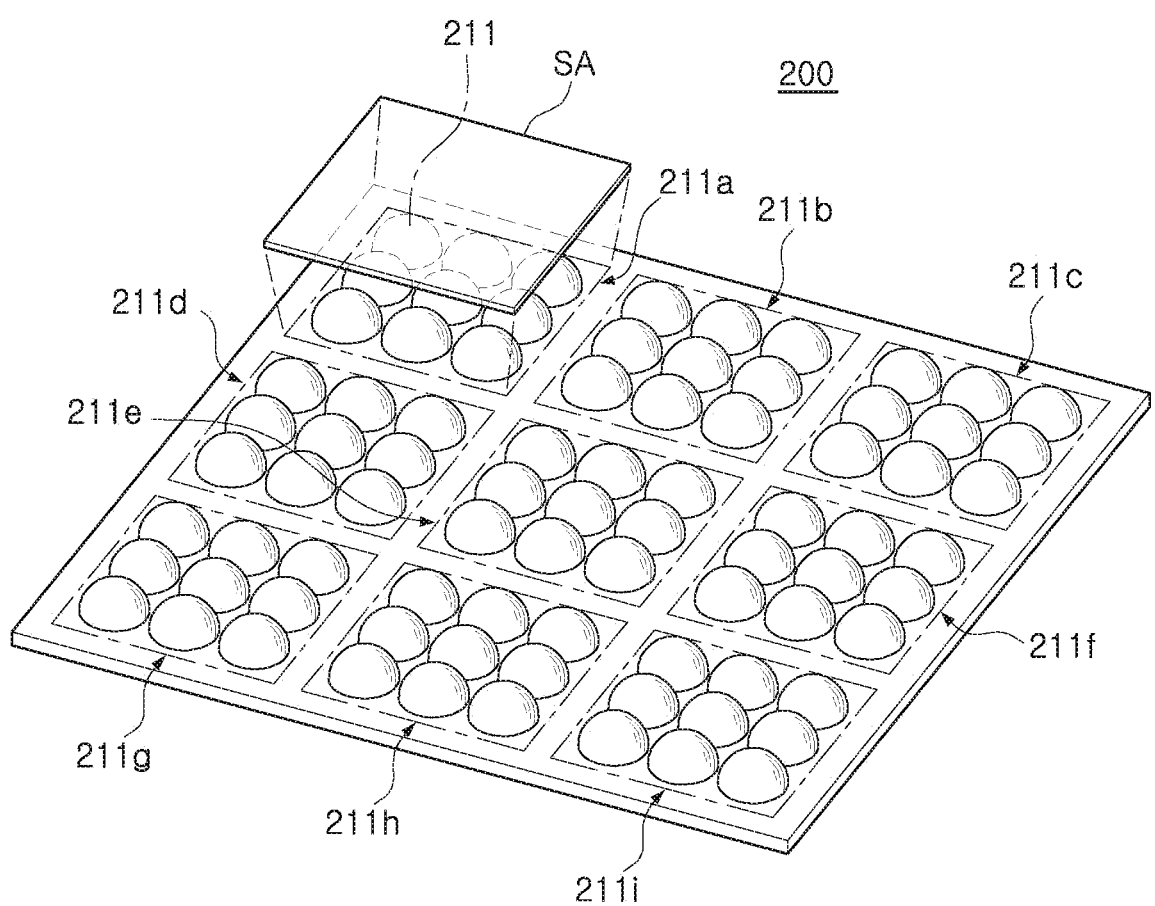

In the multi-lens array 110, lens arrays disposed in an upper portion of each of a plurality of sensors may be grouped and may be included in a single module. For example, referring to FIG. 5A, a plurality of multi-lens arrays 211$a$ to 211$i$ corresponding to a plurality of sensors adjacent to each other, respectively, may be disposed on a single support layer 213 and may be included in a single module 200, but the example embodiments are not limited thereto. The plurality of multi-lens arrays 211$a$ to 211$i$ may be applied to different sensors, respectively, and a desired and/or certain sensing area SA may be defined in an upper portion of each of the plurality of multi-lens arrays 211$a$ to 211$i$ as illustrated in FIG. 5B, but the example embodiments are not limited thereto. In this case, the plurality of multi-lens arrays 211$a$ to 211$i$ may receive reflected light incident through different sensing areas SA, and accordingly may obtain biometric information of a user (e.g., electrical signals corresponding to a fingerprint of the user).

Figure 6A:
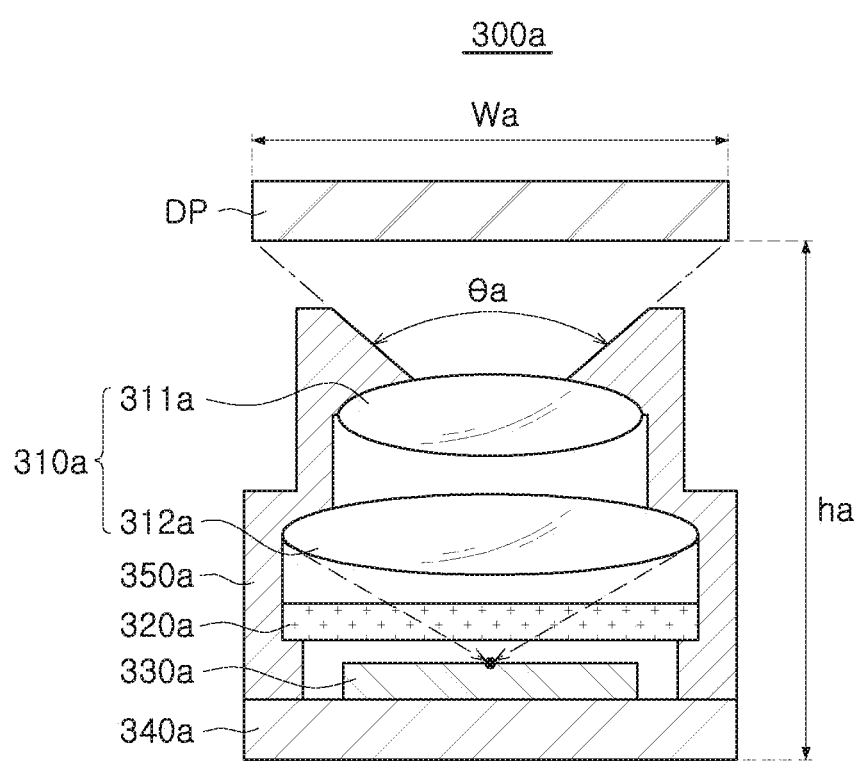
FIGS. 6A and 6B are diagrams illustrating a sensing area of a sensing module according to at least one example embodiment of the present inventive concepts.
Figure 6B:
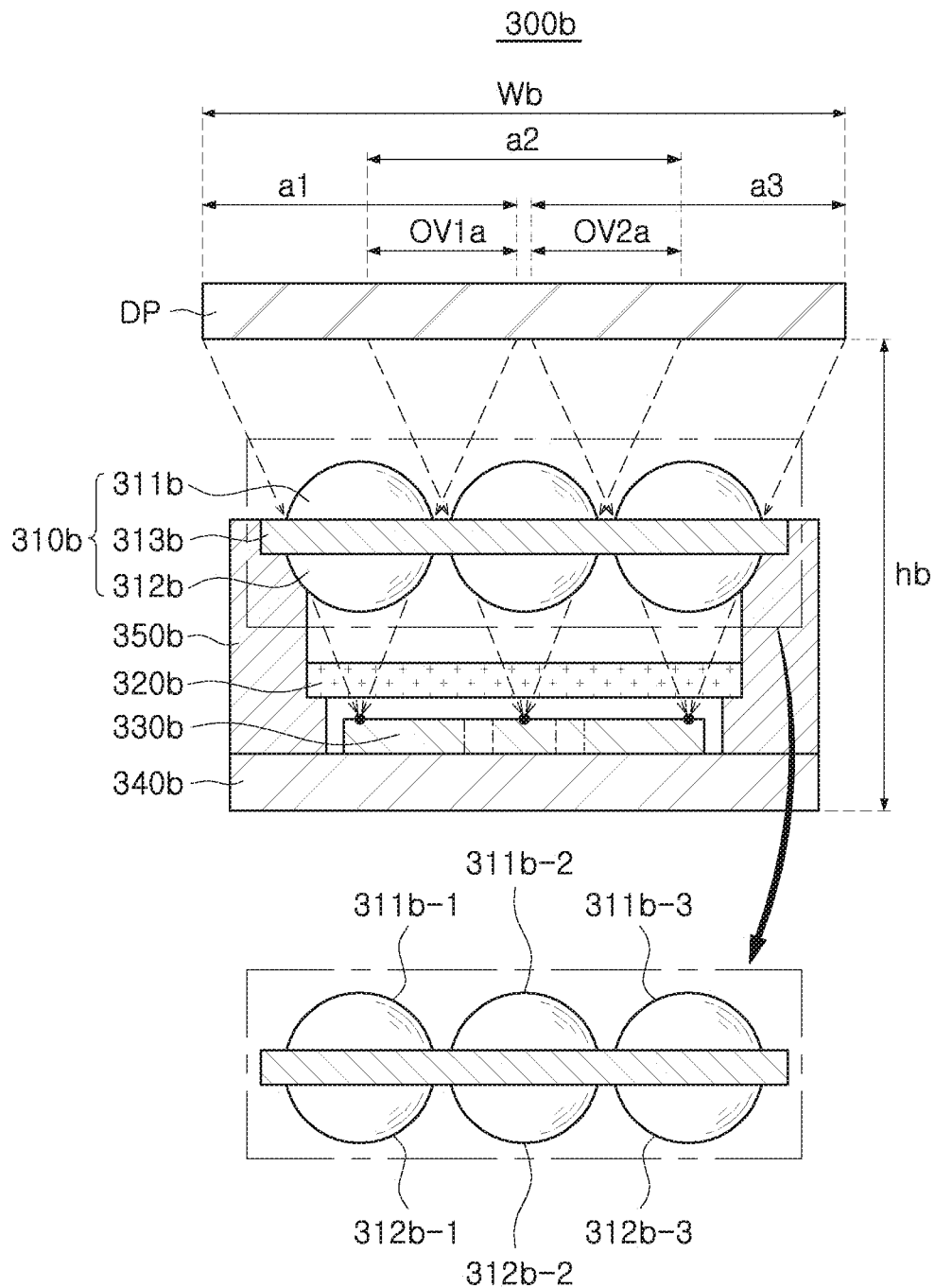

FIGS. 6A and 6B are diagrams illustrating a sensing area of a sensing module according to some example embodiments. FIG. 6A illustrates a comparative example, and FIG. 6B illustrates at least one example embodiment of the inventive concepts.

Referring to FIG. 6A, a sensing module 300$a$ in the comparative example may include a lens unit 310$a$, an optical filter 320$a$, a sensor 330$a$, a substrate 340$a$, and/or a holder 350$a$, etc., but the example embodiments are not limited thereto. The lens unit 310$a$ may include a first lens 311$a$ and a second lens 312$a$ stacked in a direction perpendicular to the substrate 340$a$.

An overall field of view of the lens unit 310$a$ may have a viewing angle of θa, and a width of a sensing area defined on a display panel DP may be Wa. For example, when a first lens 311$a$ and a second lens 312$a$ are configured as wide-angle lenses having a field of view of 120 degrees or greater, an overall field of view of the lens unit 310$a$ may be 90 degrees or greater, etc., but the example embodiments are not limited thereto and other types of lenses and/or lenses with different field of view angles may be used.

A height of the sensing module 300$a$ may be a distance from a lower surface of the display panel DP to a lower surface of the substrate 340$a$, and may be denoted by "ha."

Referring to FIG. 6B, a sensing module 300$b$ in at least one example embodiment may include a multi-lens array 310$b$, an optical filter 320$b$, a sensor 330$b$, a substrate 340$b$, and/or a holder 350$b$, but the example embodiments are not limited thereto. Different from the lens unit 310$a$ illustrated in FIG. 6A, the multi-lens array 310$b$ may include a plurality of first lenses 311*b* (e.g., a layer of first lenses) and a plurality of second lenses 312*b* (e.g., a layer of second lenses) disposed in parallel to an upper portion and a lower portion of a support layer 313*b*, respectively. The first and second lenses 311*b* and 312*b* may include various combinations of lenses having various shapes and fields of view. For example, first to third microlenses 311*b*-1 to 311*b*-3, the first lenses 311*a*, may have a radius of curvature and a field of view the same as those of fourth to sixth microlenses 312*b*-1 to 312*b*-3, the second lenses 312*a*, but the example embodiments are not limited thereto. As another example, the first to third microlenses 311*b*-1 to 311*b*-3 may have a radius of curvature and a field of view different from those of the fourth to sixth microlenses 312*b*-1 to 312*b*-3, etc.

An overall field of view of the multi-lens array 310*b* may have a viewing angle of θb, and a width of a sensing area defined on the display panel DP may be Wb. In the sensing module 300*b*, a plurality of lenses may be disposed in parallel such that an overall field of view may be greater than the field of view in the comparative example in FIG. 6A (θb>θa), and accordingly, a width of the sensing area defined on the display panel DP may also be increased (Wb>Wa). In at least one example embodiment, an overall field of view of the multi-lens array 310*b* may be approximately 70 degrees or greater, but the example embodiments are not limited thereto.

A height of the sensing module 300*b* (e.g., a thickness of the sensing module 300*b*) may be a distance from a lower surface of the display panel DP to a lower surface of the substrate 340*b*, and may be denoted by "hb." In the sensing module 300*b*, as the plurality of lenses are disposed in parallel (e.g., arranged in a vertical manner), a height of the module may decrease as compared to the comparative example illustrated in FIG. 6A (hb<ha). In at least one example embodiment, a height of the sensing module 300*b* may be approximately 4 mm or lower, but is not limited thereto.

Reflected light incident from a first sensing area a1 of the display panel DP may be divided according to different incident angles by the first microlens 311*b*-1, may be combined by the fourth microlens 312*b*-1, and may form a focus on the sensor 330*b*, however the example embodiments are not limited thereto. Also, reflected light incident from a second sensing area a2 of the display panel DP may be divided according to different incident angles by the second microlens 311*b*-2, may be combined by the fifth microlens 312-2, and may form a focus on the sensor 330*b*, however the example embodiments are not limited thereto. A reflected light signal incident from a third sensing area a3 of the display panel DP may be divided according to different incident angles by the third microlens 311*b*-3, may be combined by the sixth microlens 312-3, and may form a focus on the sensor 330*b*, however the example embodiments are not limited thereto.

According to some example embodiments, the first sensing area a1 and the second sensing area a2 may partially overlap (or fully overlap) each other in a direction parallel to the display panel DP, but the example embodiments are not limited thereto. The second sensing area a2 and the third sensing area a3 may partially overlap (or fully overlap) each other in a direction parallel to the display panel DP, but the example embodiments are not limited thereto. Whether the first to third sensing areas a3 overlap one another, a degree of the overlap may be varied depending on the number of the lenses included in the multi-lens array 310*b*, and/or a shape, a field of view, and/or the like, of each of the lenses. Biometric information repeatedly detected from an area of overlap OV1*a* between the first sensing area a1 and the second sensing area a2, and from an area of overlap OV2*a* between the second sensing area a2 and the third sensing area a3 may be represented as a single image through an image process using a desired and/or certain algorithm, such as an image stitching algorithm discussed in connection with FIG. 7. However, the example embodiments are not limited thereto and there may be a greater or lesser number of sensing areas and/or areas of overlap present in the example embodiments.

Figure 7:
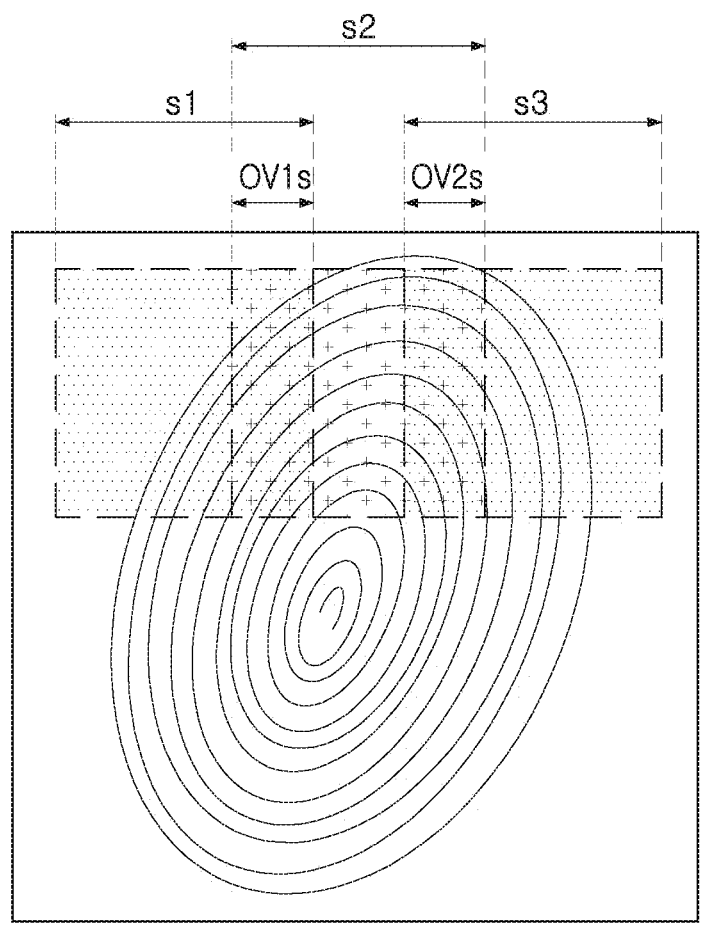
FIGS. 7 and 8 are diagrams illustrating an operation of a sensing module according to at least one example embodiment of the present inventive concepts.
Figure 8:
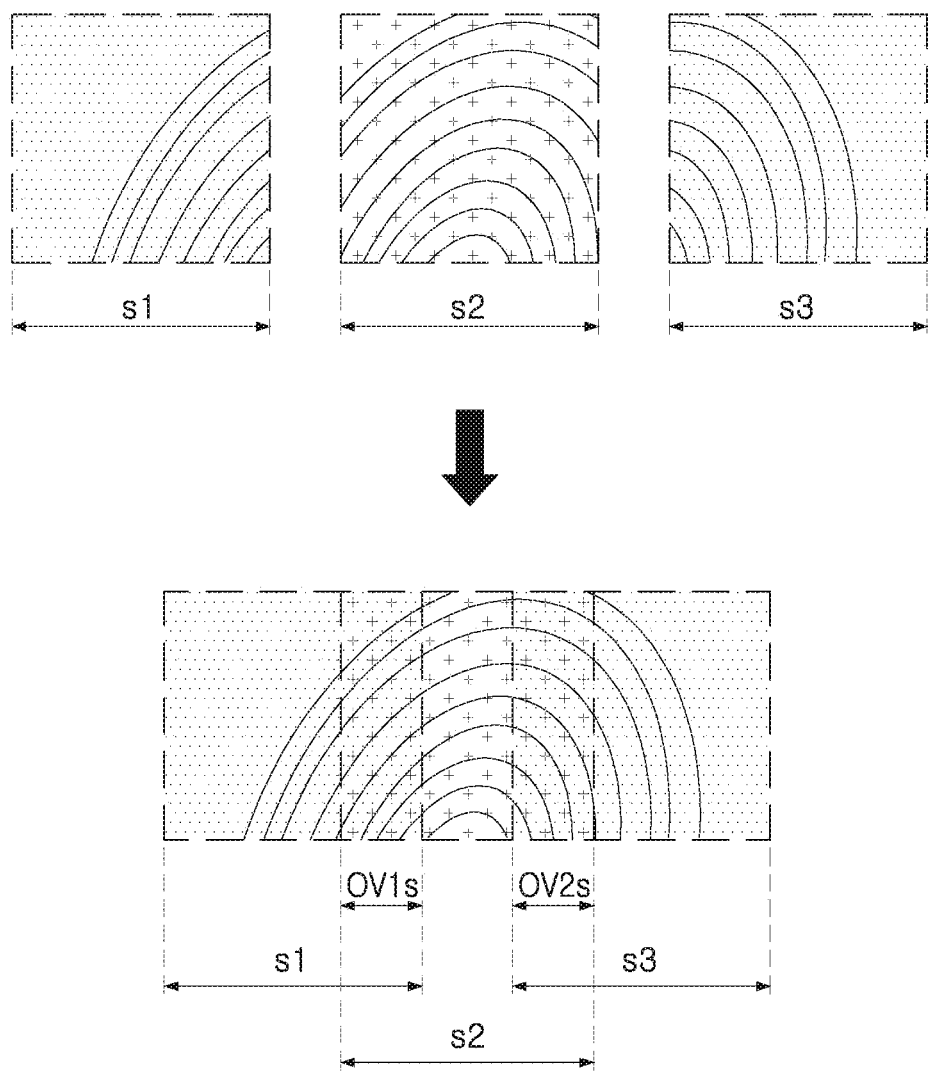

FIGS. 7 and 8 are diagrams illustrating an operation of a sensing module according to some example embodiments.

FIG. 7 illustrates an example of a fingerprint image of a user adjacent to a plurality of sensing areas. Referring to FIGS. 6B and 7, a sensing module 300*b* may obtain an image of a first fingerprint region s1 of a user (e.g., a first biometric region) through a first sensing area a1 (e.g., first sensing region) of the sensing module 300*b*. The sensing module 300*b* may obtain an image of a second fingerprint region s2 of a user (e.g., a second biometric region) through a second sensing area a2 (e.g., a second sensing region) of the sensing module 300*b*. The sensing module 300*b* may also obtain an image of a third fingerprint region s3 of a user (e.g., a third biometric region) through a third sensing area a3 (e.g., a third sensing region) of the sensing module 300*b*.

The first fingerprint region s1 and the second fingerprint region s2 may also partially overlap each other, and an overlapping area OV1*s* may be formed in response to an overlapping area OV1*a* between the first sensing area a1 and the second sensing area a2 of the sensing module 300*b*. The second fingerprint region s2 and the third fingerprint region s3 may also partially overlap each other and an overlapping area OV2*s* may be formed in response to an overlapping area OV2*a* between the second sensing area a2 and the third sensing area a3.

Images of the first to third fingerprint regions s1 to s3 of a user obtained from the first to third sensing areas a1 to a3 may be represented as in the example embodiment illustrated in FIG. 8, however the example embodiments are not limited thereto and there may be a greater or lesser number of fingerprint regions and/or sensing areas according to other example embodiments. As the first to third fingerprint regions s1 to s3 overlap one another, fingerprint information of a user obtained by the sensing module 300*b* may be disconnected at a boundary between the images (and/or at a boundary between sensing areas of the sensor module 300*b*). Accordingly, the sensing module 300*b* may generate a single image having smoothly connected boundaries by performing image processing on the plurality of obtained images using a desired and/or certain algorithm. In at least one example embodiment, the sensing module 300*b* may perform image processing using a stitching algorithm for connecting matching parts or portions of the obtained images. The sensing module 300*b* may generate a single image by sensing reflected light and performing the above-described image processing on the plurality of obtained images, thereby obtaining fingerprint information of a user in which the disconnected parts of the plurality of obtained images are smoothly connected in a single image.

In the description below, a sensing module will be described in accordance with other example embodiments with reference to FIGS. 9 to 11.

Figure 9:
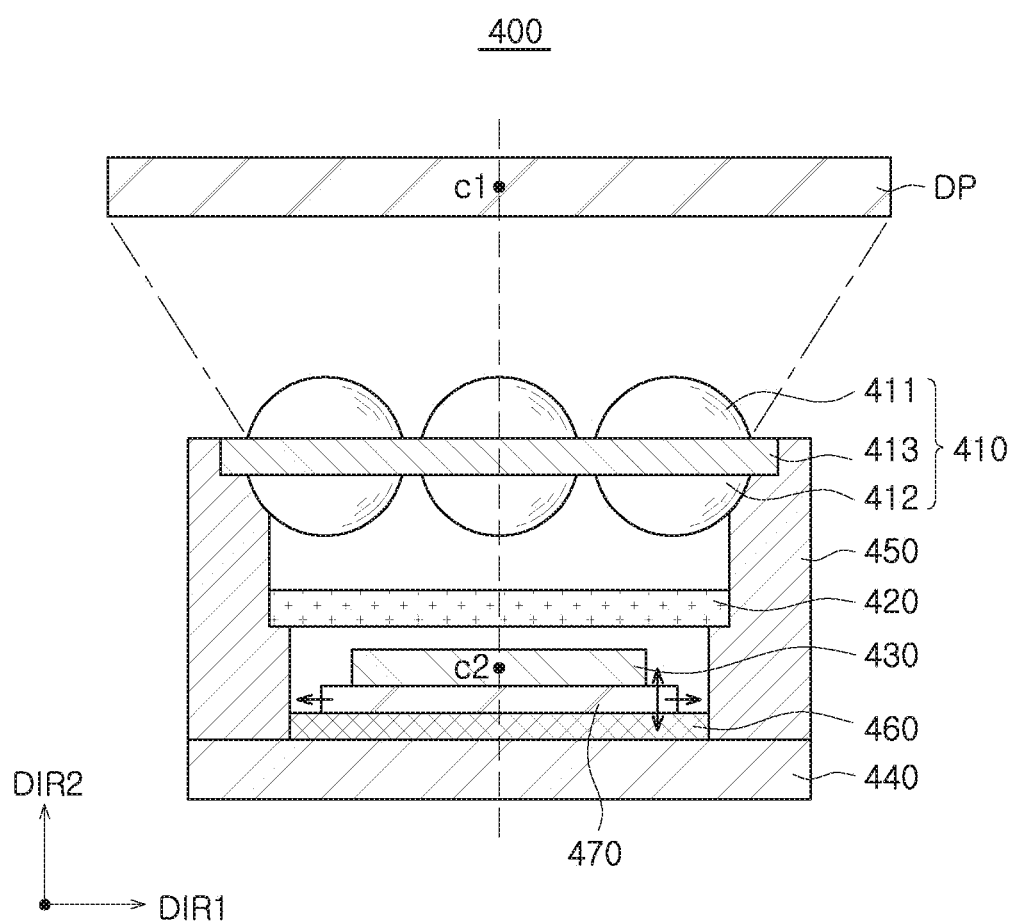
FIG. 9 is a diagram illustrating a sensing module according to at least one example embodiment of the present inventive concepts.
Figure 10A:
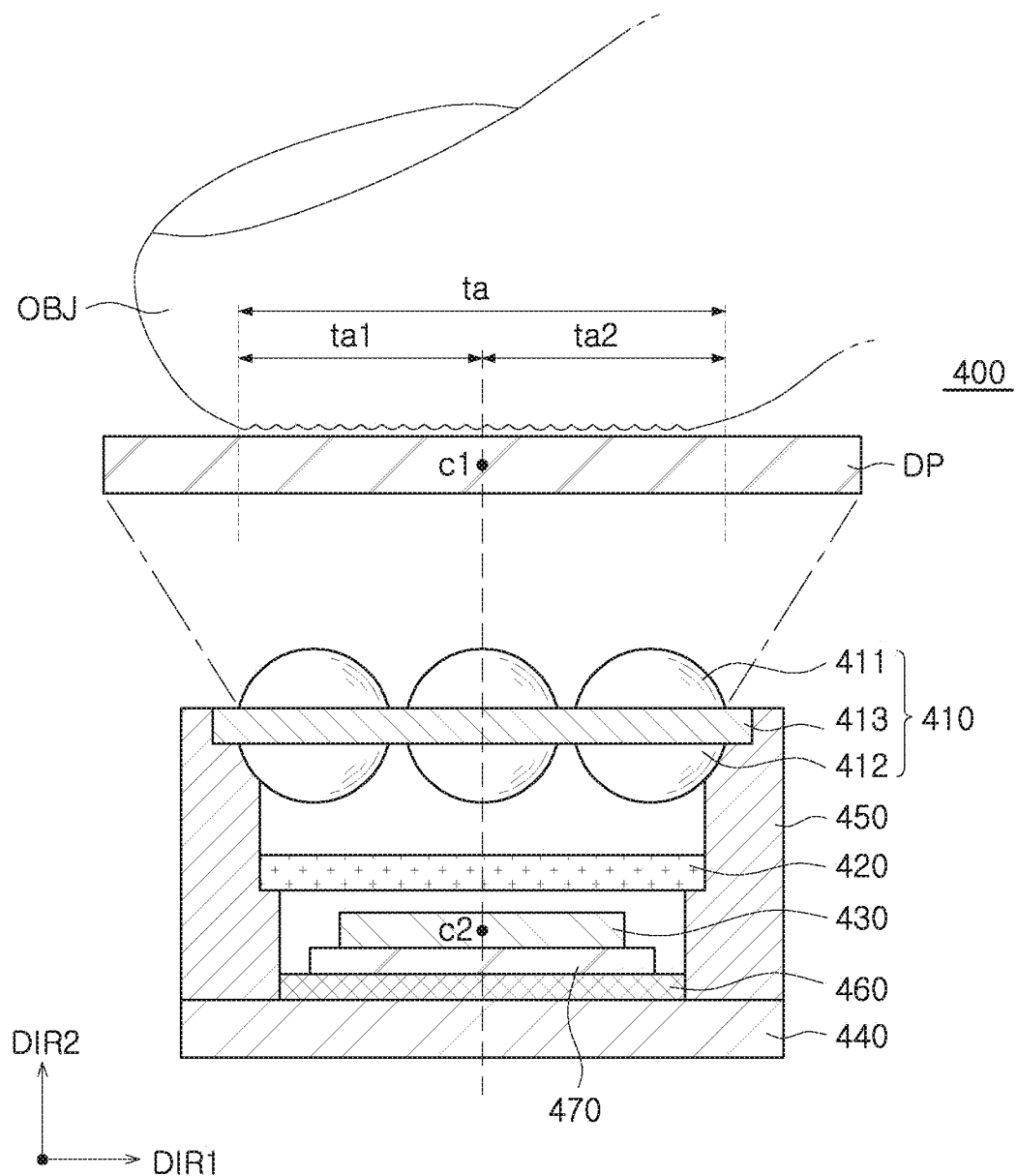
FIGS. 10A and 10B are diagrams illustrating an operation of a sensing module according to at least one example embodiment of the present inventive concepts.
Figure 10B:
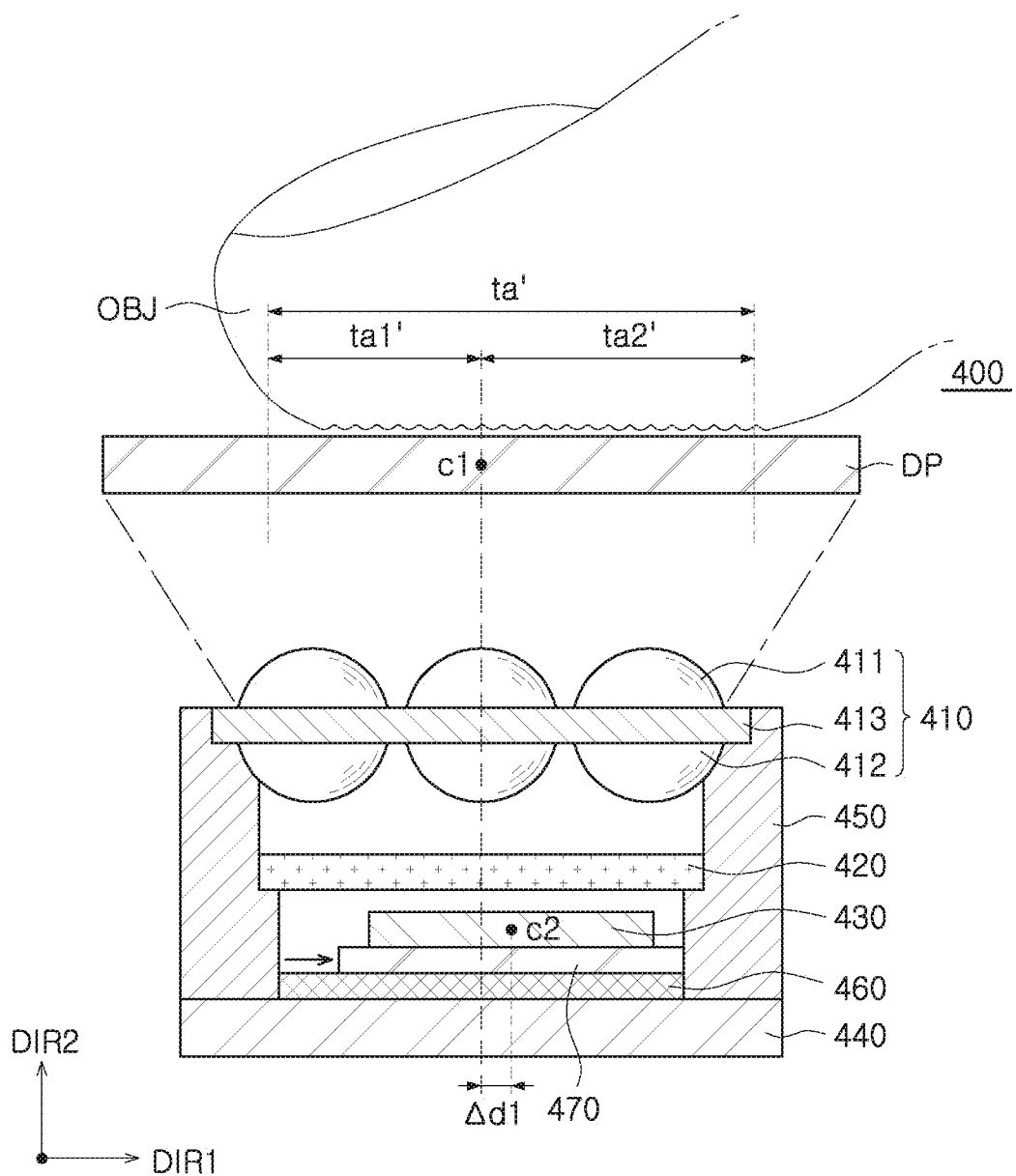

FIG. 9 is a diagram illustrating a sensing module according to at least one example embodiment. FIGS. 10A and 10B are diagrams illustrating an operation of a sensing module according to some example embodiment. FIG. 11 is a block diagram illustrating a configuration of a sensing module according to at least one example embodiment.

Referring to FIG. 9, a sensing module 400 may include a multi-lens array 410, an optical filter 420, a sensor 430, a substrate 440, and/or a holder 450, etc., but the example embodiments are not limited thereto. According to some example embodiments, the sensing module 400 may further include a plate 460 and/or a sensor position control layer 470, etc.

The sensor 430 may include a plurality of light sensing devices (e.g., photodetectors, light sensors, photo-electric cells, etc.). The plurality of light sensing devices may receive an optical signal incident to an internal space of the sensing module 400 and may generate an electrical signal associated with biometric information of a user in response to and/or based on the received optical signal (e.g., in response to the photons of the received optical signal).

The multi-lens array 410 may include a plurality of lenses 411 and 412 and a support layer 413 disposed in parallel to one another. FIG. 9 illustrates an example in which the plurality of lenses 411 and 412 include a plurality of first lenses 411 (e.g., first layer of lenses) disposed in an upper portion of the support layer 413 and a plurality of second lenses 412 (e.g., second layer of lenses) disposed in a lower portion of the support layer 413, but the example embodiments are not limited thereto. The plurality of lenses 411 and 412 may have various structures, such as the example embodiments described with reference to FIGS. 4A to 5, etc.

The optical filter 420 may include a color filter, a monochrome filter, and the like. The holder 450 may be disposed on the substrate 440, and may support the multi-lens array 410 and/or the optical filter 420, etc.

The plate 460 and the sensor position control layer 470 may be disposed on an upper portion of the substrate 440, but are not limited thereto.

The plate 460 may include a material having relatively high stiffness, such as plastic, a metal, and the like, to decrease and/or prevent distortion of the substrate 440.

The sensor position control layer 470 may be disposed in an upper portion of the plate 460 and may adjust the upward and downward (e.g., vertical) positions and/or the right and left (e.g., horizontal) positions of the sensor 430. In at least one example embodiment, the sensor position control layer 470 may be attached to and integrated with the sensor 430, and may move in a first direction DIR1 and/or in a second direction DIR2 perpendicular to the first direction DIR1 on a plate 460 to control a position of the sensor 430. Additionally, in some example embodiments, the sensor position control layer 470 may rotate (e.g., turn) the sensor 430 around a point.

The sensor position control layer 470 may adjust a focus of reflected light incident to an internal space of the sensing module 400 by controlling a position of the sensor 430 taken in the first direction DIR1, but is not limited thereto. Also, the sensor position control layer 470 may adjust a range in which the sensor 430 receives reflected light by controlling a position of the sensor 430 taken in the second direction DIR2, but is not limited thereto. A method of controlling a position of the sensor 430 by the sensor position control layer 470 will be described with reference to FIGS. 10A and 10B.

Referring to FIG. 10A, when a center of a fingerprint region ta of a finger OBJ disposed adjacent to (e.g., on top of) a sensing area of a display panel DP and a center c1 of the sensing area (ta1=ta2) are arranged in the second direction DIR2 (e.g., the center of the fingerprint region ta is aligned with the center c1 of the sensing area), the sensor position control layer 470 may adjust a position of the sensor 430 in the first direction DIR1 to arrange a center c2 of the sensor 430 with the center c1 of the sensing area in the second direction DIR2 (e.g., the center c2 of the sensor 430 is aligned with the center c1 of the sensing area). In at least one example embodiment, a position in which the center c1 of the sensing area and the center c2 of the sensor 430 are arranged in the second direction DIR2 may be a basic and/or default position of the sensor 430. In this case, the sensor 430 may receive all reflected light signals reflected off of and/or from the finger OBJ.

Additionally, when a center of a fingerprint region ta' of the finger OBJ is disposed adjacent to a sensing area of the display panel DP and the center c1 of the sensing area (ta1'≠ta2') are not arranged in the second direction DIR2 as illustrated in FIG. 10B (e.g., the center of the fingerprint region ta' is not in alignment with the center c1 of the sensing area), the sensor position control layer 470 may adjust a position of the sensor 430 to arrange a center of the sensor 430 with the center of the fingerprint region ta' in the second direction DIR2 (e.g., the center of the sensor 430 is positioned to be aligned with the center of the fingerprint region ta'). In the at least one example embodiment of FIG. 10B, as the finger OBJ of a user is disposed adjacent to a right side of the sensing area with reference to the center c1 of the sensing area (ta2'>ta1'), the sensor position control layer 470 may move the sensor 430 in the first direction DIR1 from the center c1 of the sensing area by a desired and/or certain distance $\Delta d1$. In this case, as the amount of the reflected light signal received in the sensor 430 increases due to the repositioning of the sensing area, the sensing accuracy of the sensing module 400 may improve.

Figure 11:
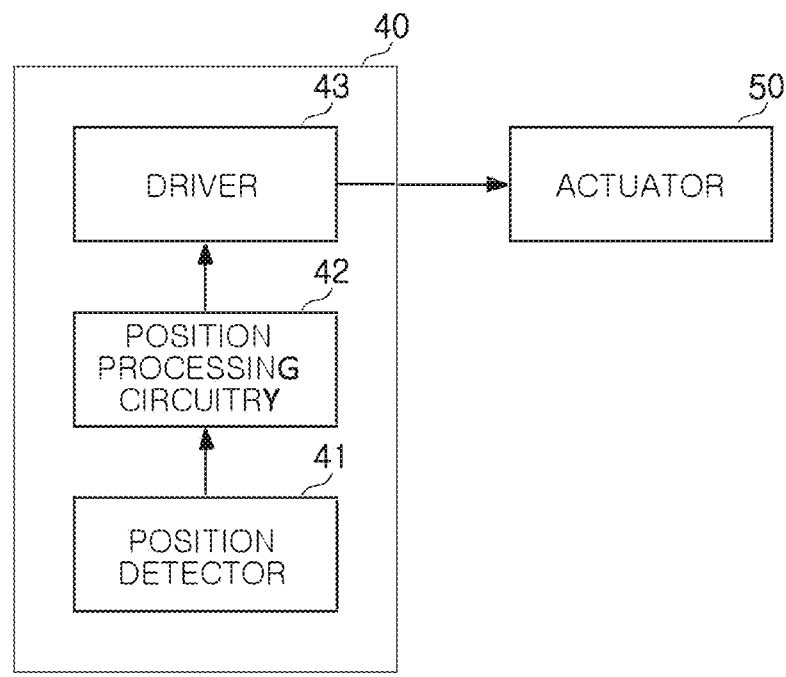
FIG. 11 is a block diagram illustrating a configuration of a sensing module according to at least one example embodiment of the present inventive concepts.

The sensing module 400 may be configured to control a position of the sensor 430, and as illustrated in FIG. 11, the sensing module 400 may include control processing circuitry 40 (e.g., a controller, etc.) and/or an actuator 50, etc.

The control processing circuitry 40 may control the actuator 50 to allow the sensor position control layer 470 to control a position of the sensor 430. To this end, the control processing circuitry 40 may include a position detector 41, position processing circuitry 42 (e.g., a position controller, etc.), and/or a driver 43, etc., but is not limited thereto. According to at least one example embodiment, the control processing circuitry 41 and/or the position processing circuitry 42 may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The position detector 41 may detect a position of a part of a user's body OBJ (e.g., a finger, etc.) in a sensing area of the display panel DP. In at least one example embodiment, the position detector 41 may detect a position of the part of a user's body OBJ using a piezoelectric sensor, a heat sensor, and/or the like. The position processing circuitry 42 may generate a position control signal for adjusting a position of the sensor 430 based on position information detected by the position detector 41. For example, the position processing circuitry 42 may generate a position control signal for adjusting a position of the sensor 430 taken in the first direction DIR1 and/or a position of the sensor 430 taken in the second direction DIR2 based on a position of the part of a user's body OBJ in the sensing area, but is not limited thereto. The driver 43 may drive the actuator 50 based on the position control signal received from the position processing circuitry 42. The processing circuitry 40 and/or the position processing circuitry 42 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The actuator 50 may generate driving force for moving the sensor position control layer 470 in the first direction DIR1 and/or a second direction DIR2 under control of the driver 43. The actuator 50 may include at least one motor having a driving coil and a driving magnetic material, but is not limited thereto. For example, the actuator 50 may include a rotary motor, a piezo-actuator, a voice coil motor, etc.

In the description below, additional example embodiments of a sensing module will be described in detail with reference to FIGS. 12 to 14.

Figure 12:
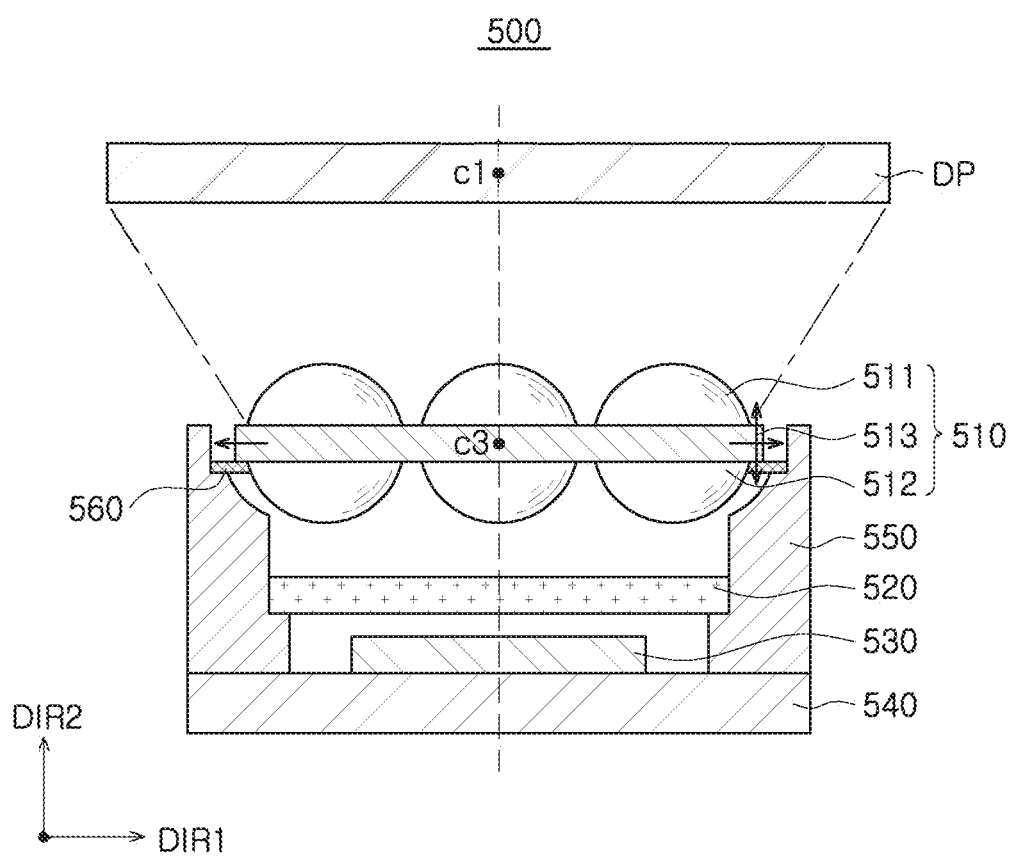
FIG. 12 is a cross-sectional diagram illustrating a sensing module according to at least one example embodiment of the present inventive concepts.
Figure 13A:
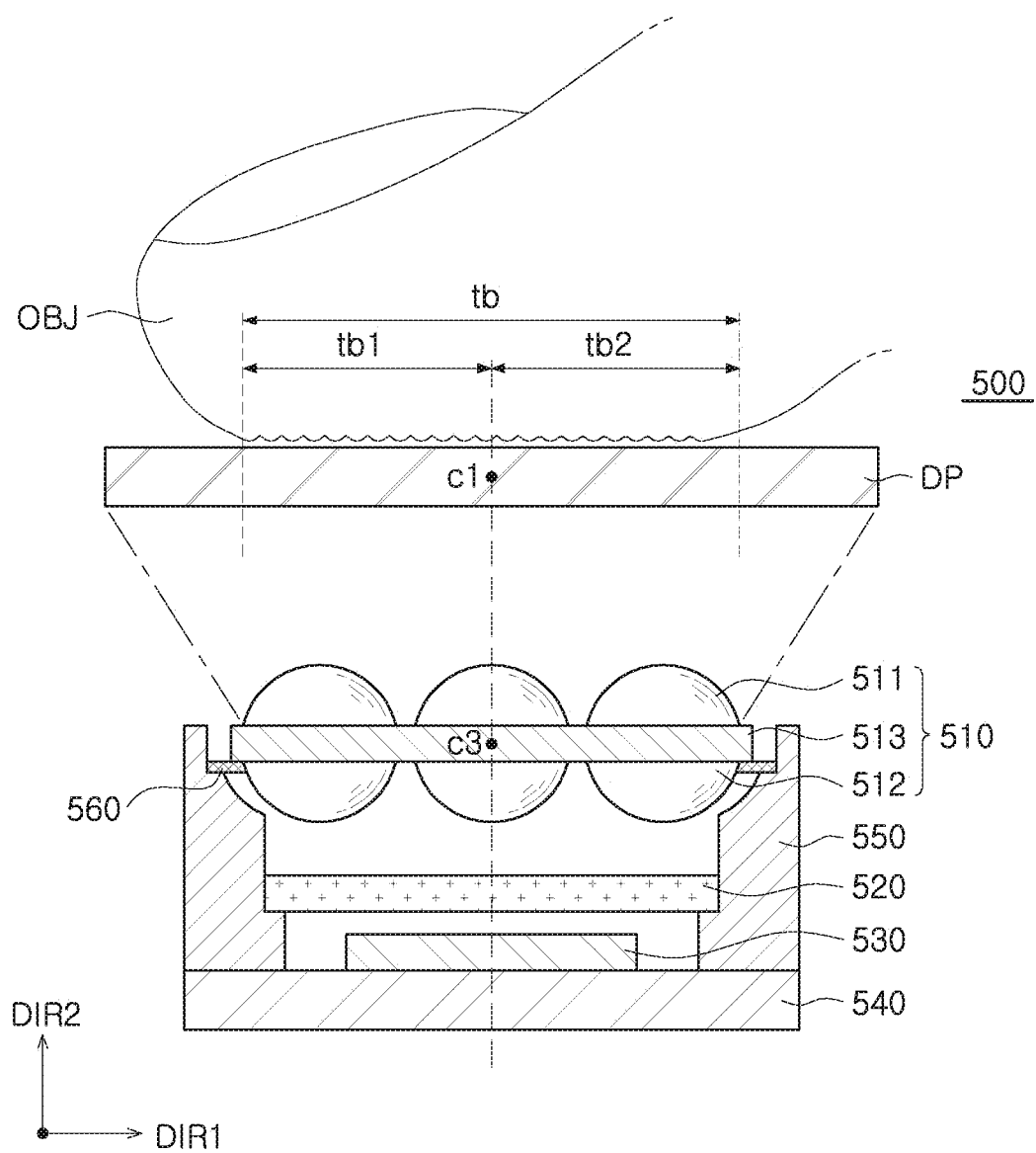
FIGS. 13A and 13B are diagrams illustrating an operation of a sensing module according to at least one example embodiment of the present inventive concepts.
Figure 13B:
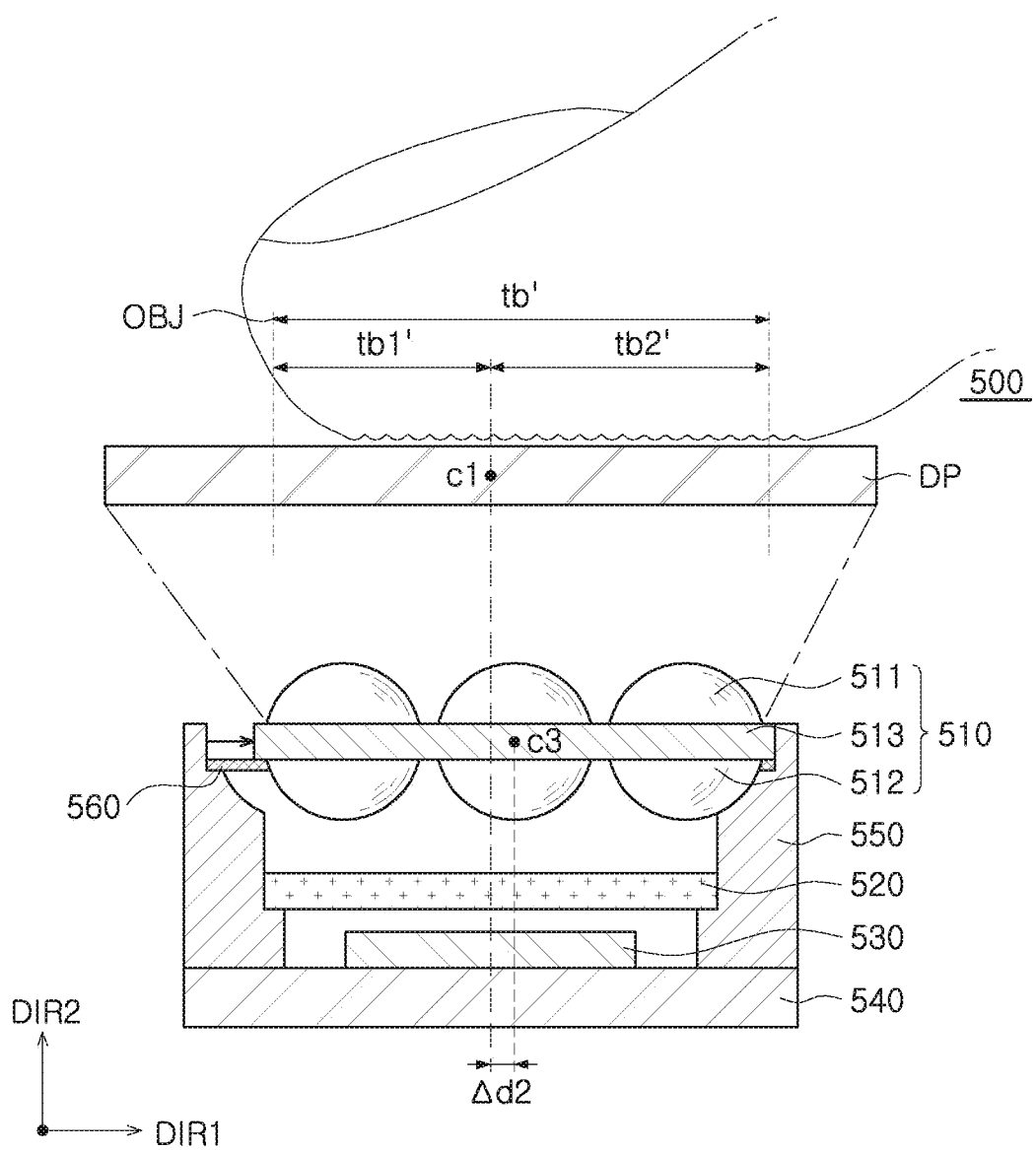

FIG. 12 is a cross-sectional diagram illustrating a sensing module according to at least one example embodiment. FIGS. 13A and 13B are diagrams illustrating an operation of a sensing module illustrated in FIG. 12 according to some example embodiments.

Referring to FIG. 12, a sensing module 500 may include a multi-lens array 510, an optical filter 520, a sensor 530, a substrate 540, and/or a holder 550, etc., but is not limited thereto. The sensing module 500 may further include a lens position control layer 560, etc.

The sensor 530 may include a plurality of light sensing devices which may receive an optical signal incident to an internal space of the sensing module 500.

The multi-lens array 510 may include a plurality of lenses 511 and 512 disposed on a support layer 513 and disposed in parallel to each other. FIG. 12 illustrates the example in which the plurality of lenses 511 and 512 may include a plurality of first lens 511 (e.g., a first layer of lenses) disposed in an upper portion of the support layer 513 and a plurality of second lenses 512 (e.g., a second layer of lenses) disposed in a lower portion of the support layer 513, but the example embodiments are not limited thereto. The plurality of lenses 511 and 512 may have various structures, such as the example embodiments described with reference to FIGS. 4A to 5B, but not limited thereto.

The optical filter 520 may include a color filter, a monochrome filter, and the like. The holder 550 may be disposed on the substrate 540 and may support the optical filter 520 and/or the lens position control layer 560, etc.

The lens position control layer 560 may be disposed between the support layer 513 and the holder 550 in the second direction DIR2 and may adjust a position of the support layer 513, but is not limited thereto. The lens position control layer 560 may adjust a position of the support layer 513 taken in the first direction DIR1 and/or a second direction DIR2, etc., to transfer a greater amount (e.g., an increased amount) of reflected light signals to the sensor 530. Or in other words, if an increased amount of reflected light is desired and/or required for the sensing of the biometric information of the user (e.g., the biometric information and/or fingerprint of a user was not successfully read), command instructions may be transmitted to the lens position control layer from processing circuitry, at least one processor, etc., to reposition the support layer 513 into a desired position(s) to obtain the increased amount of reflected light.

Referring to FIG. 13A, when a center of a fingerprint region tb of a finger OBJ disposed adjacent to a sensing area of a display panel DP and a center c1 of the sensing area (tb1=tb2) are arranged (e.g., aligned) in the second direction DIR2, the lens position control layer 560 may adjust a position of the support layer 513 in the first direction DIR1 to arrange a center c3 of the support layer 513 and the center c1 of the sensing area (e.g., align the center c3 of the support layer 513 with the center c1 of the sensing area) in the second direction DIR2, but the example embodiments are not limited thereto. In at least one example embodiment, a position in which the center c1 of the sensing area and the center c3 of the support layer 513 are arranged in the second direction DIR2 may be a basic position of the support layer 513. In this case, the sensor 530 may receive some and/or all reflected light signals reflected from the finger OBJ.

Additionally, when a center of a fingerprint region tb' of the finger OBJ disposed adjacent to the sensing area of the display panel DP and the center c1 of the sensing area are not arranged in the second direction DIR2 (tb1'≠tb2') (e.g., the center of the fingerprint region is not in alignment with the center c1 of the sensing area), the lens position control layer 560 may adjust a position of the support layer 513 in the first direction DIR1 to arrange the center of the support layer 513 and the center of the fingerprint region tb' in the second direction DIR2 (e.g., align the center of the support layer 513 with the center of the fingerprint region tb'). In the example embodiment of FIG. 10B, as the finger OBJ of a user is disposed adjacent to a right side of the sensing area with reference to the center c1 of the sensing area (tb2'>tb1'), the lens position control layer 560 may move the support layer 513 in the first direction DIR1 from the center c1 of the sensing area by a desired and/or certain distance Δd2 in order to align the center of the finger OBJ with the center c1 of the sensing area. In this case, as the amount of reflected light signals received from the sensor 530 increases, sensing accuracy of the sensing module 500 may improve.

The sensing module 500 may be configured to control a position of the support layer 513, and the sensing module 500 may include at least one processing circuitry (e.g., controller, processor, etc.) (not shown) and/or an actuator (not shown), such as the processing circuitry 40 and/or actuator 50 described with reference to the example embodiment of FIG. 11, but not limited thereto. The processing circuitry may generate a control signal based on a position of the part of a user's body OBJ in the sensing area of the display panel DP, and the actuator may move the lens position control layer 560 in the first direction DIR1 and/or a second direction DIR2 in response to the control signal generated by the processing circuitry, but the example embodiments are not limited thereto. For example, the processing circuitry may generate the control signal based on results of a previous biometric information sensing operation, and if the results of the previous biometric information sensing operation was not acceptable and/or another biometric information capture is desired, the processing circuitry may generate the control signal to reposition the lens position control layer 560 to the actuator. According to at least one example embodiment, the processing circuitry may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In the description below, electronic devices including a sensing module will be described in accordance with one or more of the example embodiments.

Figure 14:
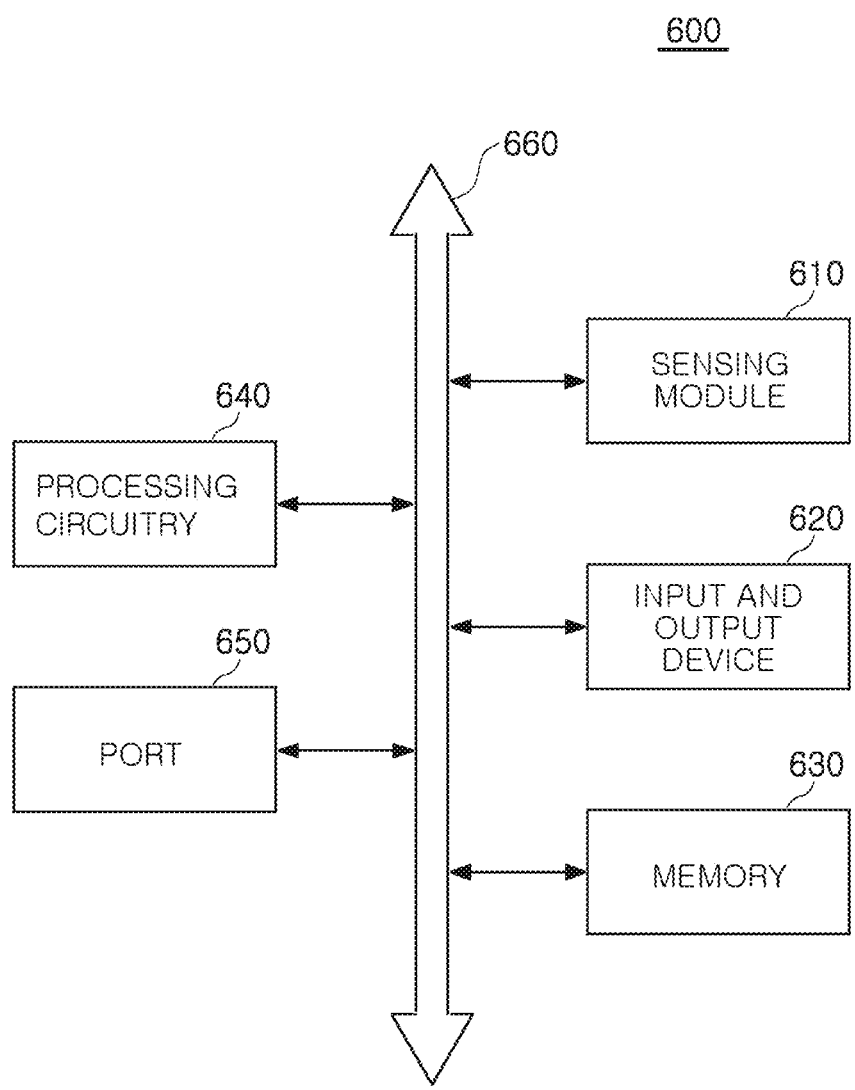
FIGS. 14 to 16 are diagrams illustrating an example of an electronic device including a sensing module according to at least one example embodiment of the present inventive concepts.

FIG. 14 is a block diagram illustrating an example of an electronic device including a sensing module according to at least one example embodiment.

Referring to FIG. 14, an electronic device 600 may include a sensing module 610, an input and output device 620, a memory 630, processing circuitry 640, a port 650, and/or the like, but the example embodiments are not limited thereto. The electronic device 600 may further include a wired and/or wireless communication device, a power device, and/or other components. Among the elements illustrated in FIG. 14, the port 650 may be provided for the electronic device 600 to communicate with a video card, a sound card, a memory card, and the like.

The electronic device 600 may include a general desktop computer, a laptop computer, a server, a smartphone, a tablet PC, a smart wearable device, a storage device (e.g., solid state drive (SSD), a hard disk drive (HDD), etc.), and the like.

The processing circuitry 640 may perform a desired and/or certain calculation or a task, or may process a command. The processing circuitry 640 may be implemented as a central processing unit (CPU), a microprocessor unit (MCU), a system on chip (SoC), a multi-core processor, a multi-processor, a distributed processing system, or the like, and may communicate with the sensing module 610, the input and output device 620, and the memory 630 and with other devices connected to the port 650 through a bus 660.

The memory 630 may be a non-transitory storage medium storing data required for operation of the electronic device 600, multimedia data, or the like. The memory 630 may include a volatile memory, or a non-volatile memory such as a flash memory, or the like. The memory 630 may include at least one of a solid state drive (SSD), a hard disk drive (HDD), and an optical disc drive (ODD).

The input and output portion 620 may include an input device such as a keyboard, a mouse, a touch screen, a microphone, a camera, and the like, and an output device such as a display, an audio output unit, a haptic feedback device, and the like.

The sensing module 610 may be mounted on a package substrate and may be connected to the processing circuitry 640 by the bus 660 or other communication means. The sensing module 610 may be employed in the electronic device 600 in various manners as described in the aforementioned example embodiments with reference to FIGS. 1 to 13, but is not limited thereto.

Figure 15:
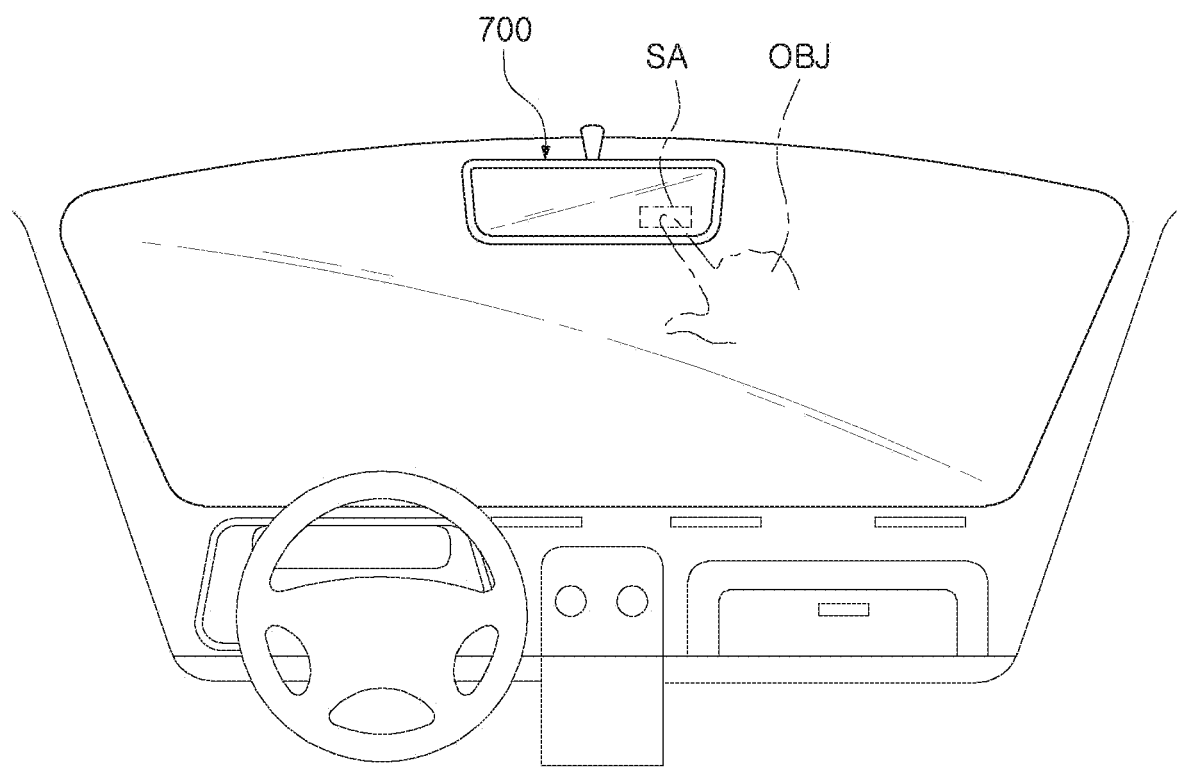
Figure 16:
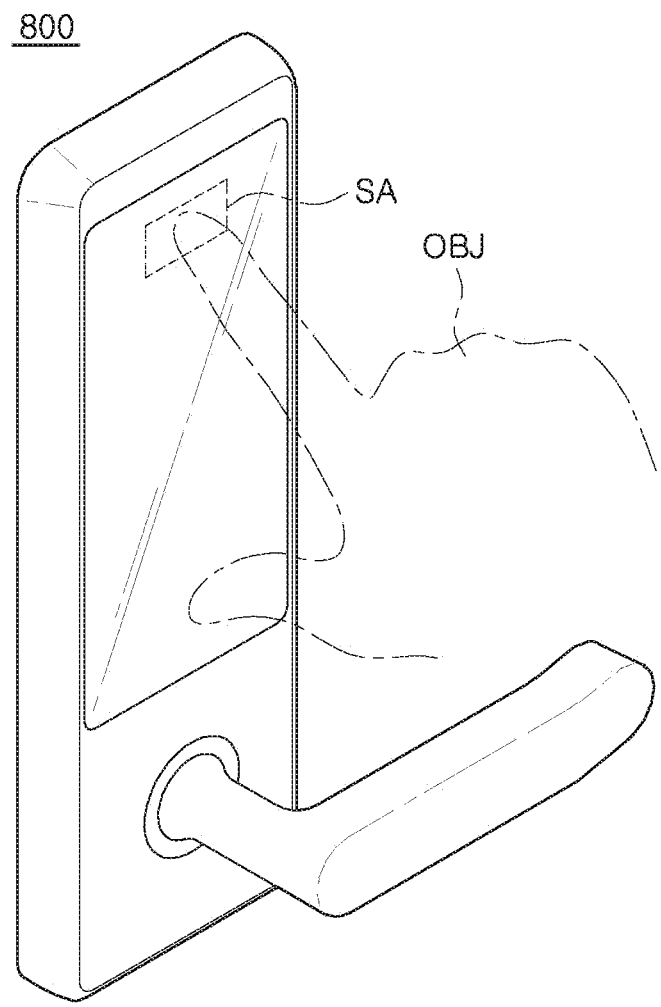

FIGS. 15 and 16 are diagrams illustrating examples of an electronic device including a sensing module according to some example embodiments.

Referring to FIG. 15, an electronic device 700 may be implemented as a smart mirroring device of a vehicle, but the example embodiments are not limited thereto.

The electronic device 700 may be embedded, integrated, connected, and/or installed in a vehicle, and the electronic device 700 may include a body having a mirroring function, and/or a displaying function, etc., a housing forming an exterior of the electronic device 700 and having a supporting function, etc. For example, the electronic device 700 may be a rear-view mirror, a dashboard, a heads-up-display, an instrument panel, a windshield, a navigation system, an entertainment system, a smartphone, a tablet, etc., but the example embodiments are not limited thereto. A display may be disposed on a front side of the body and may be externally exposed, and the display may provide driving information, peripheral images, and/or other information, etc., of a vehicle. A desired and/or certain sensing area SA may be defined on the display, and a user may place a part of a user's body OBJ approximately to the sensing area SA, and may provide biometric information, thereby conducting user authentication to enable biometrically protected functions and/or information stored on the electronic device and/or vehicle, etc.

Referring to FIG. 16, an electronic device 800 may also be implemented as a digital door-lock device, but the example embodiments are not limited thereto.

The electronic device 800 may include a display having an interface function (e.g., a user interface, a manual keypad, a virtual keypad, and/or a graphical user interface, etc.) for user authentication procedures. For example, a desired and/or certain key arrangement may be displayed on the display, and a user may input an authentication key number by touching the key arrangement disposed on the display to open or close the digital door-lock device, etc. Also, a sensing area SA may be defined on the display, and a user may place a part of a user's body OBJ approximately to the sensing area SA, and may provide biometric information to open or close the digital door-lock device 800 upon verification of the user's biometric information.

According to one or more of the aforementioned example embodiments, as the electronic device includes the sensing module having a multi-lens array, a thickness of the electronic device and/or the sensing module may be reduced.

Also, as the electronic device includes a sensing module having a multi-lens array, a size of the sensing area of the sensing module may increase, and/or the number of layers of lenses of the sensing module may increase, thereby increasing the accuracy of the sensing module.

Further, as the electronic device includes a sensing module having a position processing circuitry, the electronic device may adaptively receive reflected light such that the sensing accuracy of the sensing module may improve.

While various example embodiments have been shown and described above, it will be apparent to those skilled in the art that modifications and variations could be made without departing from the scope of the present inventive concepts as defined by the appended claims.

What is claimed is:

1. An electronic device, comprising:
a first substrate;
a display panel including a plurality of light sources, the plurality of light sources configured to emit an optical signal to an object through the first substrate;
a first sensor, a second sensor, and a third sensor underneath the first substrate, the first sensor to the third sensor including processing circuitry configured to detect biometric information associated with the object by receiving a reflected light signal, the reflected light signal corresponding to the optical signal reflected off the object and transferred through the first substrate; and
a single multi-lens array between the first sensor to third sensor and the display panel, the single multi-lens array including a support layer, a first lens, a second lens, a third lens, a fourth lens, a fifth lens, and a sixth lens, the first to third lenses are directly on an upper surface of the support layer, and the fourth to sixth lenses are directly on a lower surface of the support layer, wherein the support layer is configured to transfer the reflected optical light received through the first to third lenses to the fourth to sixth lenses without one or more light blocking layers blocking or partially blocking the reflected optical light, the first lens and the fourth lens are symmetrical to each other with respect to the support layer, and provide a first sensing area sensed by the first sensor, the second lens and the fifth lens are symmetrical to each other with respect to the support layer, and provide a second sensing area sensed by the second sensor, the third lens and sixth lens are symmetrical to each other with respect to the support layer, and provide a third sensing area sensed by the third sensor, the first sensing area and the second sensing area overlap, and the second sensing area and the third sensing area overlap.

2. The electronic device of claim 1, further comprising:
an optical filter between the first sensor to the third sensor and the single multi-lens array, the optical filter configured to selectively pass the reflected light signal in response to the reflected light signal having a desired wavelength band.

3. The electronic device of claim 1, wherein
the first sensor to the third sensor are on a second substrate; and
a distance from a lower surface of the display panel to a lower surface of the second substrate is 4 mm or less in a direction perpendicular to the second substrate.

4. The electronic device of claim 1, wherein the single multi-lens array has a field of view of 70 degrees or wider.

5. The electronic device of claim 1, wherein a first distance from a lower surface of the display panel to an upper portion of at least one lens among the first to third lenses in a direction perpendicular to a second substrate is 45% or greater than a second distance from a lower surface of the display panel to a lower surface of the second substrate.

6. The electronic device of claim 1, wherein
the processing circuitry is configured to detect the biometric information using an image stitching algorithm.

7. The electronic device of claim 1, wherein the single multi-lens array further includes a plurality of seventh lenses parallel to an upper surface of the support layer.

8. An electronic device, comprising:
a display panel in an upper portion of a substrate and including a plurality of light sources configured to emit an optical signal to an object;
a first optical sensor, a second optical sensor, and a third optical sensor on the substrate, each of the first to third optical sensors configured to sense reflected light corresponding to the optical signal, the reflected light reflected from the object and passing through a detection area defined in the display panel;
a single multi-lens array between the first to third optical sensors and the display panel, the single multi-lens array including a lens support layer, a first lens, a second lens, a third lens, a fourth lens, a fifth lens, and a sixth lens, the first to third lenses are directly on an upper surface of the lens support layer, and the fourth to sixth lenses are directly on a lower surface of the lens support layer; and
a position control layer in the upper portion of the substrate including processing circuitry, the position control layer configured to control a position of at least one optical sensor among the first to third optical sensors and a position of at least one lens of the single multi-lens array, wherein the lens support layer is configured to transfer the reflected optical light received through the first to third lenses to the fourth to sixth lenses without one or more light blocking layers blocking or partially blocking the reflected optical light, the first lens and the fourth lens are symmetrical to each other with respect to the lens support layer, and provide a first sensing area sensed by the first optical sensor, the second lens and the fifth lens are symmetrical to each other with respect to the lens support layer, and provide a second sensing area sensed by the second optical sensor, the third lens and sixth lens are symmetrical to each other with respect to the lens support layer, and provide a third sensing area sensed by the third optical sensor, the first sensing area and the second sensing area are overlapped, and the second sensing area and the third sensing area are overlapped.

9. The electronic device of claim 8, wherein the processing circuitry is further configured to control the position of the at least one optical sensor among the first to third optical sensors and the position of the at least one lens of the single multi-lens array based on position information of a contact area between the object in relation to the detection area.

10. The electronic device of claim 9, wherein the position control layer is in a lower portion of the at least one optical sensor among the first to third optical sensors.

11. The electronic device of claim 9, wherein the position control layer is in a lower portion of the lens support layer.

12. The electronic device of claim 8, further comprising:
an optical filter between the first to third optical sensors and the single multi-lens array and configured to selectively pass the reflected light in response to the reflected light having a desired wavelength band.

13. The electronic device of claim 8, further comprising:
a holder including an accommodation space, the accommodation space configured to store the first to third optical sensors, and support the lens support layer.

14. The electronic device of claim 8, wherein a first distance from a lower surface of the display panel to an upper portion of the single multi-lens array in a direction perpendicular to the substrate is 45% or greater of a second distance from a lower surface of the display panel to a lower surface of the substrate.

15. The electronic device of claim 8, wherein
the at least one optical sensor is configured to detect a biometric information using an image stitching algorithm.

16. A sensing module, comprising:
a first sensor, a second sensor, and a third sensor in an upper portion of a substrate, the first to third sensors including processing circuitry, the processing circuitry configured to receive light reflected from an object adjacent to a sensing area, and obtain biometric information of the object;
a single multi-lens array in the upper portion of the substrate, the single multi-lens array including a support layer, a first lens, a second lens, a third lens, a fourth lens, a fifth lens and a sixth lens, the first to third lenses are directly on the support layer and the plurality of fourth to sixth lenses are directly on a lower support layer; and a position control layer in the upper portion of the substrate, the position control layer including position processing circuitry configured to control a position of at least one sensor among the first to third sensors and a position of at least one lens of the single multi-lens array based on position information of the object in relation to the sensing area, wherein the support layer is configured to transfer the reflected optical light received through the first to third lenses to the fourth to sixth lenses without one or more light blocking layers blocking or partially blocking the reflected optical light, the first lens and the fourth lens are symmetrical to each other with respect to the support layer, and provide a first sensing area sensed by the first sensor, the second lens and the fifth lens are symmetrical to each other with respect to the support layer, and provide a second sensing area sensed by the second sensor, the third lens and sixth lens are symmetrical to each other with respect to the support layer, and provide a third sensing area sensed by the third sensor, the first sensing area and the second sensing area are overlapped, and the second sensing area and the third sensing area are overlapped.

17. The sensing module of claim 16, wherein the position control layer includes at least one sensor position control layer between the substrate and the at least one sensor among the first to third sensors, the at least one sensor position control layer including an actuator configured to adjust the position of the at least one sensor among the first to third sensors based on signals from the position processing circuitry.

18. The sensing module of claim 17, wherein the position control layer further includes a plate in the upper portion of the substrate, the plate configured to support the at least one sensor position control layer.

19. The sensing module of claim 16, wherein the position control layer includes a lens position control layer in the upper portion of the sensor, the lens position control layer configured to adjust a position of the support layer.

* * * * *